US011898956B2

(12) United States Patent
Zondlo et al.

(10) Patent No.: US 11,898,956 B2
(45) Date of Patent: Feb. 13, 2024

(54) SPECTROSCOPIC DEVICES, SYSTEMS, AND METHODS FOR OPTICAL SENSING OF MOLECULAR SPECIES

(71) Applicant: The Trustees of Princeton University, Princeton, NJ (US)

(72) Inventors: Mark Zondlo, Princeton, NJ (US); Lei Tao, Plainsboro, NJ (US); Da Pan, Jersey City, NJ (US); Josh Collins, Wallingford, NJ (US); Paul Guiguizian, Princeton, NJ (US); Howard Y. Bell, Princeton, NJ (US); Alice Margaret Sophie Elliott, Amsterdam (NL); Patrick Minter Killough, Houston, TX (US); Bernardus Maria Geertshuis, Amsterdam (NL); Herie Javier Soto, Katy, TX (US)

(73) Assignees: SHELL OIL COMPNY, Houston, TX (US); THE TRUSTEES OF PRINCETON UNIVERSITY, Princeton, NJ (US)

( * ) Notice: Subject to any disclaimer, the term of this patent is extended or adjusted under 35 U.S.C. 154(b) by 159 days.

(21) Appl. No.: 17/432,665

(22) PCT Filed: Feb. 21, 2020

(86) PCT No.: PCT/US2020/019239
§ 371 (c)(1),
(2) Date: Aug. 20, 2021

(87) PCT Pub. No.: WO2020/172541
PCT Pub. Date: Aug. 27, 2020

(65) Prior Publication Data
US 2022/0187203 A1    Jun. 16, 2022

Related U.S. Application Data

(60) Provisional application No. 62/809,249, filed on Feb. 22, 2019.

(51) Int. Cl.
*G01N 21/39* (2006.01)
*G01J 3/42* (2006.01)
(Continued)

(52) U.S. Cl.
CPC ............... *G01N 21/39* (2013.01); *G01J 3/42* (2013.01); *G01J 3/433* (2013.01); *G01N 21/274* (2013.01);
(Continued)

(58) Field of Classification Search
CPC .... G01N 21/39; G01N 21/274; G01N 21/552; G01N 2021/3129; G01N 21/0303;
(Continued)

(56) References Cited

U.S. PATENT DOCUMENTS

| 5,801,384 A | 9/1998 | Kirchhevel |
| 8,970,842 B2 | 3/2015 | Sun et al. |

(Continued)

FOREIGN PATENT DOCUMENTS

| DE | 102013201459 A1 | 7/2014 |
| JP | 2009014661 A | 1/2009 |

(Continued)

OTHER PUBLICATIONS

International Search Report and Written Opinion for corresponding PCT Application No. PCT/US2020/019239, dated Jun. 19, 2020.
(Continued)

*Primary Examiner* — Kevin Quarterman
*Assistant Examiner* — Akbar Hassan Rizvi
(74) *Attorney, Agent, or Firm* — Meagher Emanuel Laks Goldberg & Liao, LLP

(57) ABSTRACT

Disclosed is a spectroscopic device, system, and method for measuring the concentration of one or more molecular species of interest in a gas, liquid or solid sample, where the device may be portable, may be commercially manufac-
(Continued)

tured, and/or may be adapted to existing systems and/or integrated with new systems to provide optical gas sensing for such systems. The disclosed devices, systems, and methods can be particularly useful in monitoring the purity of, e.g., a certain gas species, including determining whether a gas mixture contains certain gas species above a set concentration limit.

23 Claims, 22 Drawing Sheets

(51) Int. Cl.
    G01J 3/433      (2006.01)
    G01N 21/27      (2006.01)
    G01N 21/552     (2014.01)
    G01N 21/31      (2006.01)
(52) U.S. Cl.
     CPC ... *G01N 21/552* (2013.01); *G01N 2021/3129* (2013.01)
(58) Field of Classification Search
     CPC ............. G01N 2021/399; G01N 21/05; G01N 21/3504; G01N 21/031; G01J 3/42; G01J 3/433; G01J 3/0202; G01J 3/0291; G01J 3/10; G01J 3/28
     See application file for complete search history.

(56) References Cited

U.S. PATENT DOCUMENTS

| 2003/0202179 | A1* | 10/2003 | Larsen | G01J 3/0286 356/319 |
| 2011/0299084 | A1* | 12/2011 | Feitisch | G01N 21/031 356/433 |
| 2014/0049777 | A1* | 2/2014 | Sun | G01N 21/39 356/409 |
| 2016/0091418 | A1* | 3/2016 | Schachinger | G01N 21/59 356/437 |
| 2017/0059477 | A1 | 3/2017 | Feitisch et al. | |

FOREIGN PATENT DOCUMENTS

| JP | 2014206541 A | 10/2014 |
| JP | 2014219294 A | 11/2014 |
| WO | 2004015401 A1 | 2/2004 |

OTHER PUBLICATIONS

Boiarski, "Shock-Tube Diagnostic Utilizing Laser Raman Spectroscopy", SNWC Technical Report White Oak Laboratory, Apr. 17, 1975.

English translation of Japanese Office Action for corresponding Japanese Application No. 2021-549259, dated Jul. 27, 2023.

Klein, Alexander et al., "Rapid, Time-Division Multiplexed, Direct Absorption- and Wavelength Modulation-Spectroscopy", Sensors, vol. 14, pp. 21497-21513, 2014.

English translation of Japanese Office Action for corresponding Japanese Application No. 202080014817.8, dated Aug. 12, 2023.

* cited by examiner

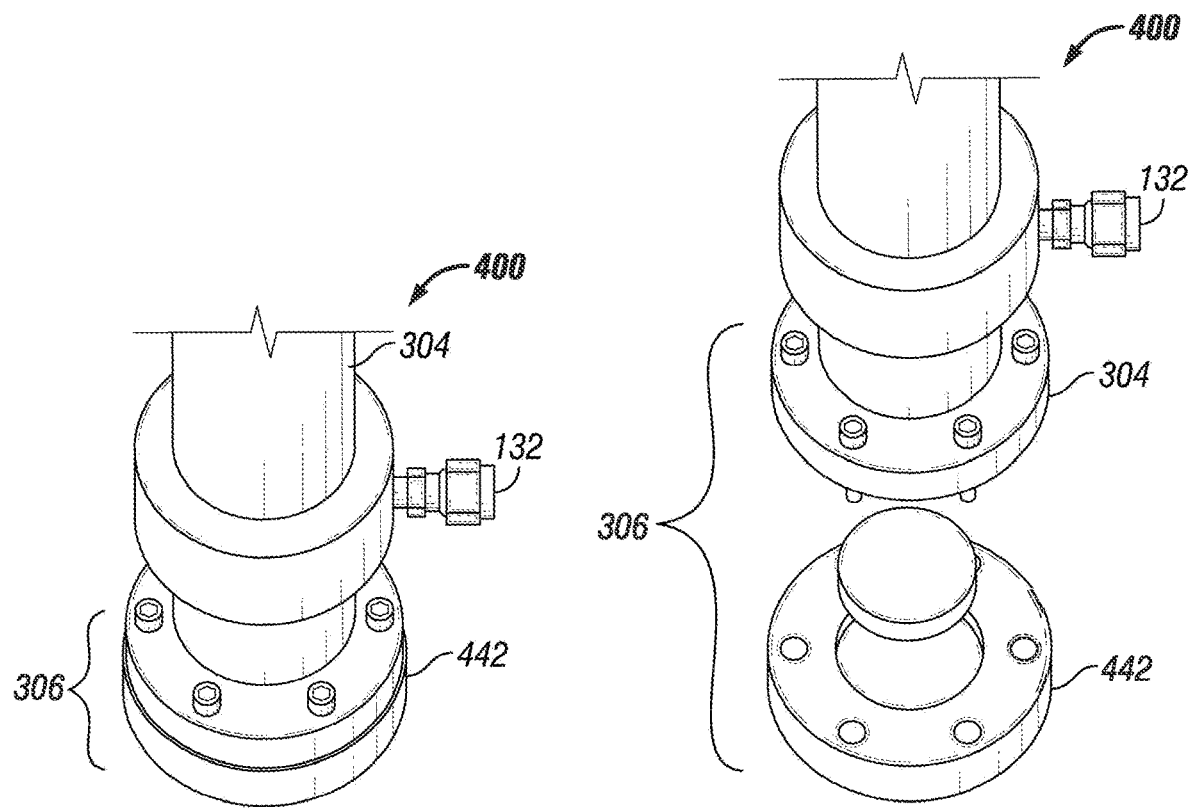
FIG. 4B    FIG. 4C
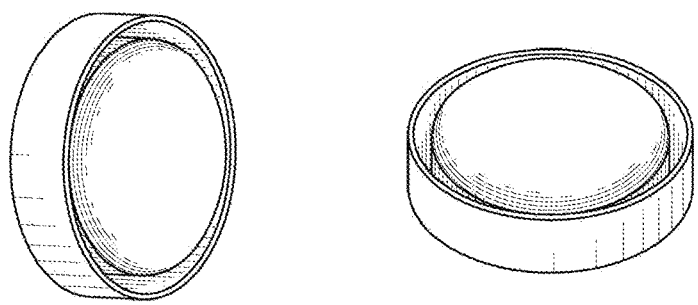 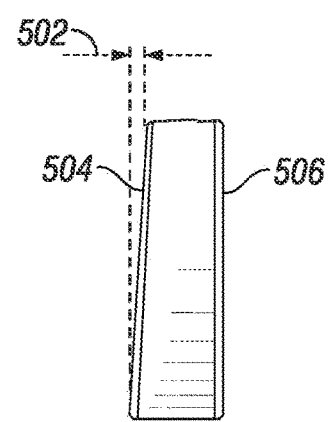
FIG. 5A    FIG. 5B    FIG. 5C

SPECTROSCOPIC DEVICES, SYSTEMS, AND METHODS FOR OPTICAL SENSING OF MOLECULAR SPECIES

CROSS-REFERENCE TO RELATED APPLICATIONS

This application claims priority to U.S. Provisional Application No. 62/809,249, filed Feb. 22, 2019, which is herein incorporated by reference in its entirety.

TECHNICAL FIELD

The present disclosure relates to spectroscopic devices, systems, and methods to measure the concentration information one or more molecular species of interest in a gas, liquid or solid sample.

BACKGROUND

Spectroscopic devices, methods, and systems have been used to determine the concentration of a molecular species of interest in a gas, liquid or solid sample. The molecular species of interest may be a trace gas, which is a gas that makes up less than 1% by volume of the Earth's atmosphere, and it includes all gases except nitrogen (78.1%) and oxygen (20.9%). To maintain accurate concentration measurements over a prolonged period of time, the optical devices and systems should be calibrated periodically to account for system drift, precision, and noise. Typically, system calibration may be done using a separate reference cell or by interrupting the measurement to calibrate, both of which add complexity to the use of such optical systems. U.S. Pat. No. 8,970,842 B2, which is incorporated herein by reference in its entirety, addresses these issues by providing an in-line calibration system for laser-based optical sensors. U.S. Pat. No. 8,970,842 B2, however, provides an experimental setup to implement the disclosed laser-based optical sensing method and is silent with respect to particular arrangement and configuration details of a sensor device. Moreover, although U.S. Pat. No. 8,970,842 can provide an adequate manner of calibration, it still has certain limitations, such as the use of a reference gas species that is different from the gas species of interest to be detected in the gas sample. Further, U.S. Pat. No. 8,970,842 is also silent with respect to optically sensing a gas sample containing multiple species of interest. As such, it would be desirable to provide systems and methods that address these and other shortcomings of existing systems and methods.

BRIEF SUMMARY

The present disclosure provides features of a spectroscopic device (which may be referred to as devices) for measuring the concentration of one or more molecular species of interest in a gas, liquid or solid sample, where the device may be portable, may be commercially manufactured, and/or may be adapted to existing systems and/or integrated with new systems to provide optical gas sensing for such systems. The present disclosure also provides features of a system (which may be referred to as systems) in which such optical sensing of a gas sample is desirable and options of how the spectroscopic device described herein can be part of such a system. The present disclosure further provides features of a spectroscopic method for measuring the concentration of one or more molecular species of interest in a gas, liquid or solid sample, and the method may preferably be employed by the spectroscopic device or system described herein. The disclosed devices, methods, and systems may allow for more accurate measurements of one or more gas species in a gas sample using optical sensors. The disclosed devices, methods, and systems have applications in a wide range of industries, including but not limited to environmental monitoring, industrial sensing, biomedical sensing, defense sensing, food and beverage sensing, and sensing applications in agricultural technology, animal diagnostics, authentication, and pharmaceutical identification. Specific applications include blood analysis for glucose, breath analysis for disease or bad breath. Certain applications include measuring the concentration (which implicitly includes detecting) of gas species that require open-path measurements such as long-path or integrated measurements, fence line monitoring, or gas species that cannot be sampled easily in a controlled environment. The disclosed methods and systems can be used in either open-path configurations under ambient conditions where absorption features are broadened and overlap with one another, or closed path configurations. Other applications include measuring the concentration (which implicitly includes detecting) specific molecules in liquid or solid sample that require an Attenuated Total Reflection cell (ATR) to contact with the sample.

The disclosed devices, systems, and methods can be particularly useful in monitoring the purity of a certain gas, preferably hydrogen gas, which includes determining whether the hydrogen gas contains certain gas species of interest above a set concentration limit. Many applications use high purity (such as 99% or greater) hydrogen gas. One such particular application is in fuel cell vehicles (FCVs), also known as or fuel cell electric vehicles (FCEVs), which use hydrogen gas to power an electric motor. Unlike traditional cars or trucks that run on gasoline or diesel and produce carbon monoxide and carbon dioxide emissions, FCEVs react hydrogen and oxygen to produce electricity which powers an electric motor and generates water as the product of the reaction. An FCEV has a fuel cell stack that takes hydrogen gas, stored onboard the FCEV, and reacts it with oxygen from the air. High purity hydrogen gas is typically preferred for use in FCEVs because the fuel cells can be sensitive to low concentrations of certain gas species that can contaminate a fuel cell and lower its efficiency and power output. Gas species that can contaminate a fuel cell include sulfur-containing compounds, such as hydrogen sulfide ($H_2S$); carbon monoxide (CO); methane ($CH_4$); water vapor ($H_2O$); and ammonia ($NH_3$). Accordingly, the disclosed devices, systems, and methods can be implemented to monitor the presence and concentration of one or more gas species of interest concentration in a gas sample, particularly one that is at high purity, such as the hydrogen gas dispensed from a storage tank, including at a hydrogen refueling station to FCEVs and/or for use in other applications.

U.S. Pat. No. 8,970,842 provides an experimental setup in its FIG. 1B that would pose various challenges in adapting its teachings to various applications outside an experimental setting, from uses at industrial plants, such as chemical plants, mines, field operations, water treatment plants, wastelands, restaurants, to uses in FCEVs or biomedical applications, such as in hospitals.

In contrast, the present disclosure provides a spectroscopic device that may be commercially adapted for various applications, including the applications and industries noted above. In particular, the spectroscopic device can include portability features that allow it to be connected to various systems to provide the desired sensing application, particularly a hydrogen fuel cell. The spectroscopic device described herein may be suitable for high-volume manufacturing methods. The spectroscopic device described herein may be provided with its own spectroscopic signals processor (such as a computer or hardware running a spectroscopic signals processing software) to analyze and interpret the data generated by the spectroscopic device. Additionally, or alternatively, the spectroscopic device described herein may be modified as known to one of ordinary skill so it may be provided separately for use with (an)other existing spectroscopic signals processor(s) that can be used to analyze and interpret the data generated by the spectroscopic device.

The devices, systems, and methods can perform calibration to provide accurate concentration measurements of one or more gas species of interest without the drawbacks associated with conventional calibration methods, such as a separate reference cell with a separate optical reference path or off-line calibration. The calibration can be done with a reference gas species that is the same as at least one of the one or more gas species of interest in the gas sample. The use of a reference gas species that is the same as one in the gas sample may allow for more accurate measurements. For instance, in optical sensing scenarios where there are long periods of time when a gas species of interest is not present in the gas sample, changes in the conditions of the sensor environment over time (such as electrical current, pressure, and/or temperature) can cause the light source to drift away from the spectral region of where a selected absorption feature of the gas species of interest is located, which may result in the sensor missing the presence of the gas species of interest in the gas sample entirely or generating inaccurate information about the absorbance, and as a correlation, the concentration of the gas species of interest in the gas sample. The reference gas provides a constant absorption signal to maintain the settings of the light source on the selected spectral region to detect the selected absorption feature whenever it occurs, regardless of the length of time that passes between such detection.

In contrast, U.S. Pat. No. 8,970,842 ("the '842 patent") employs a reference gas species (gas A) that is different from the gas species of interest in the gas sample (gas B), where gas A has absorption features that can be observed while also probing the spectroscopic feature of interest in gas B. In particular, U.S. Pat. No. 8,970,842 discloses ethylene as the reference gas species and ammonia as the gas species of interest in the gas sample. Such approach, however, has the potential of introducing more complexities to the process. For instance, a selection for the appropriate reference gas species that has the desired absorption features is needed. Moreover, an understanding of the relationship between the change in spectral properties of the reference gas species and the gas species of interest in the sample as the conditions of the environment change (such as change in temperature) would be needed to provide accurate optical sensing measurements that account for those differences. For example, accurate optical sensing measurements would ideally account for how the reference gas species behave spectrally at higher temperatures during the day as compared to the gas species of interest versus their behaviors at lower temperatures at night. Furthermore, the potential need to account for changes in the spectral properties of the reference species in changing conditions with respect to the gas species of interest itself introduces opportunities for inaccuracies due to challenges in being able to perfectly account for such differences. The use of one or more of the same gas species in the reference gas and the gas sample as described in the present disclosure eliminates the need to account for this potential spectral behavior variance as the change in the reference gas species would be the same change for the gas species of interest in the gas sample, thereby reducing complexities as well as chances for inaccuracies to be introduced. Such calibration of the system is particularly useful in FCEVs where the hydrogen gas provided to the fuel cell stack is expected to have high purity (>99.9%) so there may not be any other gas present, and/or the spectral absorption of any other gas species in the hydrogen gas is below the detection limit for long periods of time. ISO standard 14687-2:2012, for example, sets permitted levels of contaminants for hydrogen supplied to vehicles equipped with polymer electrolyte membrane (PEM) fuel cells. Nevertheless, accurate concentration measurement of gas species of interest is desired in applications that are sensitive to their presence at certain concentration limits, such as hydrogen dispensed to a hydrogen fuel cell, and gases released from various sources, such as people, animals, machinery, and geological settings.

Further, the '842 patent does not address detection of multiple gas species in the gas sample. Having the option to detect and measure the concentration of more than one gas species in a gas sample is also particularly useful in any application requiring hydrogen of high purity where multiple potentially harmful gas species may be present in the hydrogen gas, such as when hydrogen may be provided from a range of different supply chains.

Accordingly, the present disclosure provides a spectroscopic device comprising a sensing unit that comprises a light source module, a detector module, and a sample cell between the light source module and the detector module. The light source module comprises a light source module housing and a light source that is configured to transmit an interrogation light beam along an optical path directed toward the detector module. The detector module comprises a detector module housing, a reference gas, and a detector; both the reference gas and detector are in the detector module housing. Alternatively, the light source module, instead of the detector module, may comprise the reference gas. The detector is positioned in the optical path and the reference gas is provided such that the optical path extends from the light source through the sample cell and the reference gas toward the detector.

Optionally, the light source module can comprise a first light transmission window to allow the optical path from the light source module to continue to the sample cell, and the detector module can comprise a second light transmission window to allow the optical path from the sample cell to continue to the detector module. The sample cell can comprise a sample gas input port and a sample gas output port to allow a sample gas to be introduced to the sample cell and optionally to ensure mixing of the gas sample as applicable. For instance, the sample gas input port and the sample gas output port can be positioned at an angle in a range of 0 degree and about 180 degrees from each other. The sample gas input port can be positioned closer to the light source module than the detector module, and the sample gas output port can be positioned closer to the detector module than the light source module.

According to another aspect, instead of having the sample cell between the light source and detector, the spectroscopic device described herein can have a combined module comprising both the light source and detector, which may be referred to as the light-source-and-detector module. In such case, the sample cell may be between the light-source-and-detector module and one or more mirrors configured to direct the optical path back through the sample cell toward the light-source-and-detector module, where the sample cell may optionally comprise one or more reflective surfaces, which may be conveniently referred to as "mirrors," that create multiple reflections in the optical path therein prior to the optical path being directed toward the detector in the light-source-and-detector module. Accordingly, the present disclosure also provides a spectroscopic device comprising a light-source-and-detector module; and a sample cell, where the light-source-and-detector module comprises a light-source-and-detector module housing, a reference gas, a detector, and a light source configured to transmit an interrogation light beam along an optical path that travels through the reference gas and one or more times through the sample cell toward the detector; and where the light source, the reference gas, and the detector are in the light-source-and-detector module housing.

Optionally, the light-source-and-detector module can comprise a first light transmission window to allow the optical path from the light-source-and-detector module to continue to the sample cell and a second light transmission window to allow the optical path from the sample cell back to the light source and detector. The first light transmission window and the second light transmission window can be the same window or different windows.

Similar to where there is a separate detector module, the sample cell can optionally comprise a sample gas input port and a sample gas output port to allow a sample gas to be introduced to the sample cell. The sample gas input port can be optionally configured to accommodate the change in pressure between the source of the sample gas and the operating pressure of the sample cell, such as from a pressure in a range of 700 barg to 1000 barg to an operating pressure in a range of up to 30% below ambient pressure (about 1 bar) to up to 30% above ambient pressure, such as at least 3 barg. The sample gas input port and the sample gas output port can be positioned at an angle in a range from 0 degree to about 180 degrees from each other. The sample gas input port can be positioned closer to the light-source-and-detector module housing than the mirror and the sample gas output port can be positioned closer to the mirror than the light-source-and-detector module housing.

The following descriptions regarding optional features are applicable to the spectroscopic device as described herein regardless of whether the spectroscopic device has separate light source module and detector module or a combined light-source-and-detector module. It is understood that the order through which the optical path of the interrogation light beam travels between the reference gas and sample cell does not matter, particularly the path may be through the reference gas prior to the sample cell or vice versa. Optionally, the second light transmission window can be a light transmission window of the detector. The first and/or the second light transmission window can have an area in a range of at least 0.5 mm$^2$ and up to 30 mm$^2$ and/or have a thickness in a range of at least 0.01 mm and up to 10 mm. The first and/or the second light transmission window can be a wedged window with an angle in a range of at least 1 degree and up to 45 degrees. The first and/or the second light transmission window can be made from a material comprising at least one of sapphire, calcium fluoride ($CaF_2$), silica (preferably UV fused), magnesium fluoride ($MgF_2$), barium fluoride ($BaF_2$), N-BK7 (a RoHS-compliant borosilicate crown glass), zinc selenide (ZnSe), silicon (Si), germanium (Ge), KRS-5 (thallium bromoiodide), and any combination thereof.

The light source can be a coherent light source, which can comprise at least one of a quantum cascade laser, an interband cascade laser, a vertical cavity laser, a semiconductor laser, a vertical cavity interband cascade laser, a vertical cavity quantum cascade laser, and a distributed feedback (DFB) laser. It can also be an incoherent light source, such as a light emitting diode, or a blackbody light source.

The sample cell can contain a sample gas comprising one or more gas species of interest, where at least one gas species of interest in the sample cell is the same as one gas species of interest in the reference gas. The sample cell can contain a sample gas comprising two or more gas species of interest, where at least one gas species of interest in the sample cell is the same as one gas species of interest in the reference gas. The sample gas in the sample cell can comprise hydrogen gas containing said one or two or more gas species of interest. The hydrogen gas can have a purity of at least 99%. The one or two or more gas species of interest in the sample cell and/or the reference gas can comprise at least one of hydrogen sulfide ($H_2S$), carbon monoxide (CO), methane ($CH_4$), water vapor ($H_2O$), and ammonia ($NH_3$).

The sample cell can comprise a multi-pass optical cell. The optical path length of the multi-pass optical cell can be in a range of 10 m to 200 m, which preferably depends on integration time selected, where in general for a particular signal strength desired, a longer integration time may allow for a shorter optical path length. The sample cell can comprise a single pass optical cell, where optionally the reference cell can contain a known concentration of carbon monoxide and/or water as the gas species of interest and where optionally, the light source is configured to probe for an absorption feature at a wavelength in a range of 700 nm to 25000 nm. The optical path length of the single pass optical cell can be in a range of 0.1 m to 1000 m, preferably 0.1 m to 100 m. The spectroscopic device can be made of any suitable material known to one of ordinary skill, including aluminum, nickel, cobalt, steel, glass coated plastic, and/or hybrid materials that are a combination of materials, such as alloys including but not limited to a nickel-cobalt ferrous alloy, or a silicon containing material, for instance as a coating for other material. One of ordinary skill in the art would be able to select the desired optical path length using the Beer-Lambert Law and the optical properties of a gas species of interest as further described below.

The reference gas may be in a separate reference cell, optionally an in-line reference cell. Alternatively, the detector may comprise a detector cap that holds the reference gas allowing for the elimination of a separate reference cell. That is, the spectroscopic device optionally may not comprise a separate reference cell. Optionally, the reference gas may comprise one or two or more gas species of interest to be detected. That is, the sample cell can contain at least one gas species that is also in the reference gas. The reference gas can consist essentially of the one or two or more gas species of interest to be detected and at least one spectrally-inert gas species that does not absorb the light in the spectral region of interest within a factor of 100 of the expected absorption of the sample cell and reference gas, which can optionally be nitrogen or argon. The concentration of the one or two or more gas species of interest in the reference gas can be a known concentration, which optionally can result in an absorption comparable to the absorption near or above one or more limits against which the sample gas is analyzed. The reference gas can have a pressure that is below atmospheric pressure, which optionally can be in a range of 0.01 Torr to 100 Torr, or about 1.3 Pascal to about 13 Kilopascal.

The spectroscopic device can further comprise an electrical control unit (ECU) to (i) provide power to the device, (ii) collect, analyze, and interpret the spectroscopic data, and/or (iii) control electronic components of the device. The ECU may be located separately from the sensing unit, where the ECU can be electronically connected to the sensing unit via electrical ports on the ECU and the sensing unit. The ECU can comprise a data acquisition element configured to communicate with the sensor and light source, where the data acquisition element is coupled to a processor to provide an absorption signal of the light beam passing through the reference gas and the sample cell to the processor, where the processor is configured to isolate, from such absorption signal, a reference absorption signal from the reference gas and a sample absorption signal from the sample cell and generate calibration information and concentration information of the one or two or more gas species of interest in the sample cell using the reference absorption signal and the sample absorption signal. The reference absorption signal and the sample absorption signal each can be either a direct absorption spectroscopy (DAS) spectrum or a wavelength modulated spectroscopy (WMS) spectrum. The wavelength modulated spectroscopy (WMS) signal can comprise a 2nd or higher harmonic of the sample absorption signal.

Also, the present disclosure provides a spectroscopic method for detecting one or more gas species of interest in a gas sample. The method comprises transmitting an interrogation light beam from a light source through a reference gas comprising one or more gas species of interest in a known concentration and a sample cell containing at least one of the same gas species of interest and where the pressure of the reference gas is at reduced pressure (i.e., less than atmospheric pressure); detecting the intensity of the light beam after it passes through the reference gas and the sample cell; isolating a reference absorption signal from the reference gas and a sample absorption signal from the sample cell; generating calibration information using the reference absorption signal and the sample absorption signal; and generating concentration information of the one or two or more gas species of interest in the sample cell using the reference absorption signal and the sample absorption signal.

The generating of the calibration information can comprise: generating a direct absorption spectroscopy (DAS) signal or a wavelength modulated spectroscopy (WMS) signal as the reference absorption signal; generating a DAS signal or a WMS signal for the sample absorption signal; and setting the respective DAS or WMS reference absorption signal as the constant reference signal for the wavelength modulated spectroscopy (WMS) signal. The wavelength modulated spectroscopy (WMS) signal can comprise a 2nd or higher harmonic of the sample absorption signal.

The method can further comprise generating calibration information and/or generating concentration information while the sample gas is continuously introduced through the sample cell. Alternatively, the method can further comprise generating calibration information and/or generating concentration information of a discrete amount of sample gas in the sample cell. The sample gas in the sample cell can comprise two or more gas species of interest. The sample gas can comprise hydrogen gas containing the one or two or more gas species of interest, where optionally, the hydrogen gas can have a purity of at least 99%. The one or two or more gas species of interest can comprise at least one of hydrogen sulfide ($H_2S$), carbon monoxide (CO), methane ($CH_4$), water vapor ($H_2O$), and ammonia ($NH_3$).

The introduction of the gas sample or liquid sample to the sample cell in a discrete amount or continuously can comprise providing the sample gas to the sample cell via the sample gas input port and sample gas output port. The spectroscopic method can further comprise tuning the light source to probe for an absorption feature at a wavelength or in a range of wavelengths for one or more gas species selected from the group consisting of hydrogen sulfide ($H_2S$), carbon monoxide (CO), methane ($CH_4$), water vapor ($H_2O$), ammonia ($NH_3$), and any combination thereof. For example, optionally, if information regarding one species of interest in the sample is desired, the light source may be tuned to a wavelength of about 3300 nm for detecting methane or a wavelength of about 10300 nm for detecting ammonia. Suitable wavelengths or spectroscopic properties for such other species of interest are available via one or more public databases.

Additionally, or alternatively, the spectroscopic method can further comprise: tuning the light source to probe for an absorption feature of a first gas species of interest at a first wavelength; probing for the absorption feature of the first gas species of interest at the first wavelength for a first duration of time; tuning the light source to probe for an absorption feature of a second gas species of interest at a second wavelength; and probing for the absorption feature of the second gas species of interest at the second wavelength for a second duration of time. The third, fourth, fifth, or more gas species of interest can be detected by repeating the tuning and probing steps. If more than one gas species of interest are being detected, the tuning step can start with the gas species of interest that has an absorption feature at the highest wavelength as compared to the other gas species of interest to be detected. Optionally, if information about more than one species of interest in a sample is desired, the wavelength(s) selected may be different from detection of one species to allow use of one suitable light source, where the selected wavelengths may be closer to one another, although it is understood that a device can comprise multiple light source to achieve similar spectroscopic signals. For instance, ammonia ($NH_3$) is being detected along with at least one other species of interest, the wavelength at which an absorption feature is probed can be 8211 nm and the duration of time can be at least 50 seconds. If water vapor ($H_2O$) is also being detected, the wavelength at which an absorption feature is probed can be 8207 nm and the duration of time can be in a range of 1-10 seconds. If methane ($CH_4$) is also being detected with ammonia and/or water, the wavelength at which an absorption feature is probed can be 8206 nm and the duration of time can be in a range of 1-10 seconds. If hydrogen sulfide ($H_2S$) is also being detected with ammonia, water, and/or methane, the wavelength at which an absorption feature is probed can be 8202 nm and the duration of time (or integration time) can be at least 50 seconds. Optionally selecting wavelengths around 8000 nm for probing ammonia, water, methane, hydrogen sulfide, or any combination thereof enables use of one light source that is configured to probe at wavelengths in this spectroscopic region.

In case of detecting a liquid or solid sample, an Attenuated Total Reflection (ATR) cell may be used to contact with the sample. The ATR cell may be made of a diamond, ZnSe, ZnS, silicon, germanium or KRS-5 crystal. The liquid or solid sample is placed on top of the ATR for absorption measurement.

BRIEF DESCRIPTION OF THE DRAWINGS

FIGS. 4A-4C depict various views of another exemplary sensing unit of the spectroscopic device as described herein, which comprises a multi-pass sample cell between a light-source-and-detector module and a flange module;

FIGS. 5A-5C depicts various views of an exemplary light transmission mirror that may be used in the spectroscopic device as described herein;

DETAILED DESCRIPTION

As noted above, according to one aspect, the present disclosure provides a spectroscopic device comprising a sensing unit that comprises: a light source module, a detector module, and a sample cell between the light source module and the detector module. The light source module comprises a light source module housing and a light source that is configured to transmit an interrogation light beam along an optical path directed toward the detector module. The detector module comprises a detector module housing, a detector, and a reference gas; where the detector and reference gas are in the detector module housing and where the reference gas and detector are positioned in the optical path such that the optical path extends from the light source through the sample cell and the reference gas into the detector. Alternatively, the light source module, instead of the detector module, may comprise the reference gas. It is understood that the order through which the optical path of the interrogation light beam travels between the reference gas and sample cell does not matter, particularly the path may be through the reference gas prior to the sample cell or vice versa.

Various exemplary features of the spectroscopic device, system, and method as provided by the present disclosure will now be further described with reference to the drawings. When like elements are used in one or more figures, identical reference numbers will be used in each figure. The detailed description of the element that is provided herein, usually but not necessarily at the first occurrence, is applicable to that element in all instances, whether or not such applicability is explicitly noted. Some features of the spectroscopic device, system, and method described herein may be omitted in certain depicted configurations in the interest of clarity. Moreover, certain features such as, but not limited to electrical wiring, optical fibers, flow components (such as valves, fittings, and ports), optical coatings, connectors, and the like have not necessarily been depicted in the figures, but their presence and function will be understood by one having ordinary skill in the art. It is also understood that terms like "for example," "for instance," "such as," and "including" are exemplary and non-limiting and implicitly includes the phrase "but not limited to" unless otherwise indicated. The person skilled in the art will readily understand that, while the invention is illustrated making reference to one or more specific combinations of features and measures, many of those features and measures are functionally independent from other features and measures such that they can be equally or similarly applied independently in other embodiments or combinations.

Figure 1A:
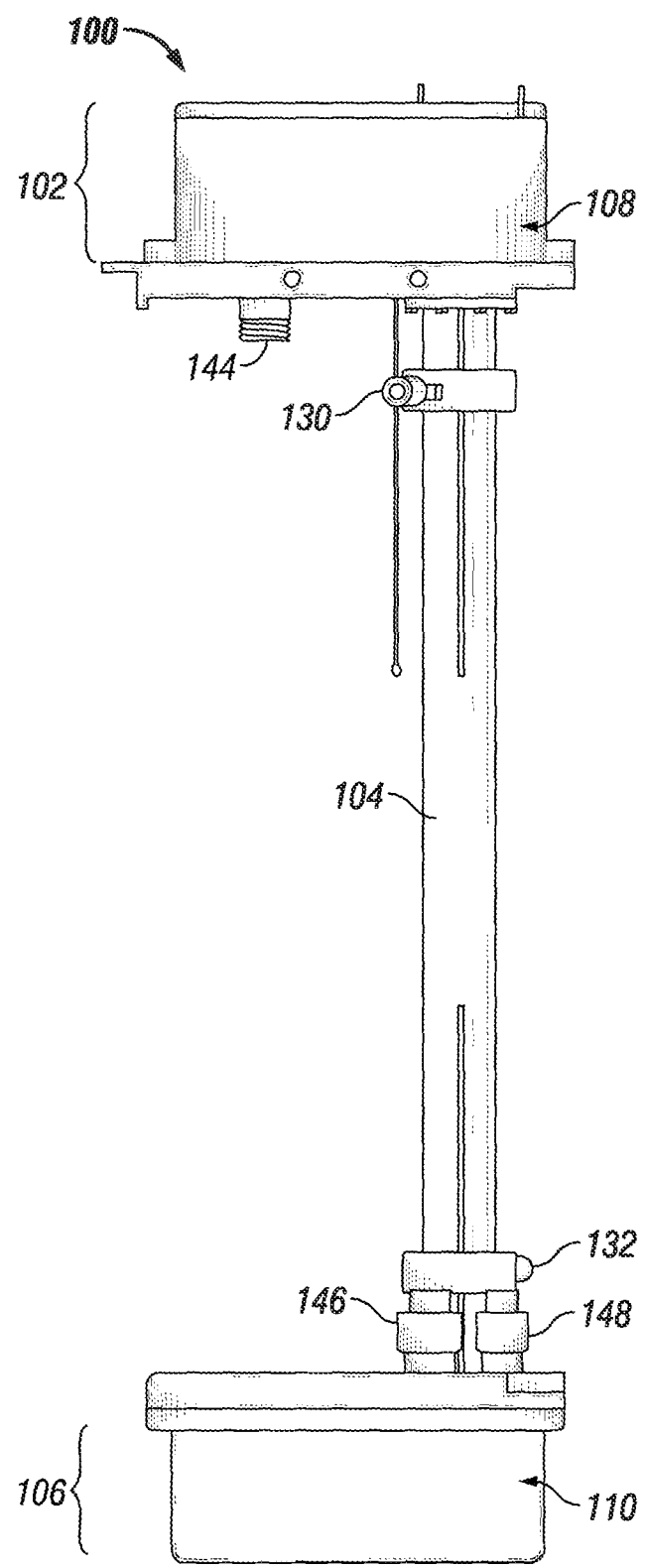
FIGS. 1A-1C depict various views of an exemplary sensing unit of the spectroscopic device as described herein, which comprises a single-pass sample cell between a light source module and a detector module.

Reference is now made to FIG. 1A, which shows spectroscopic sensing unit 100 of a spectroscopic device as described herein comprising light source module 102, a detector module 106, and a sample cell 104 between light source module 102 and detector module 106. Light source module 102 comprises light source module housing 108. Detector module 106 comprises detector module housing 110.

Figure 1B:
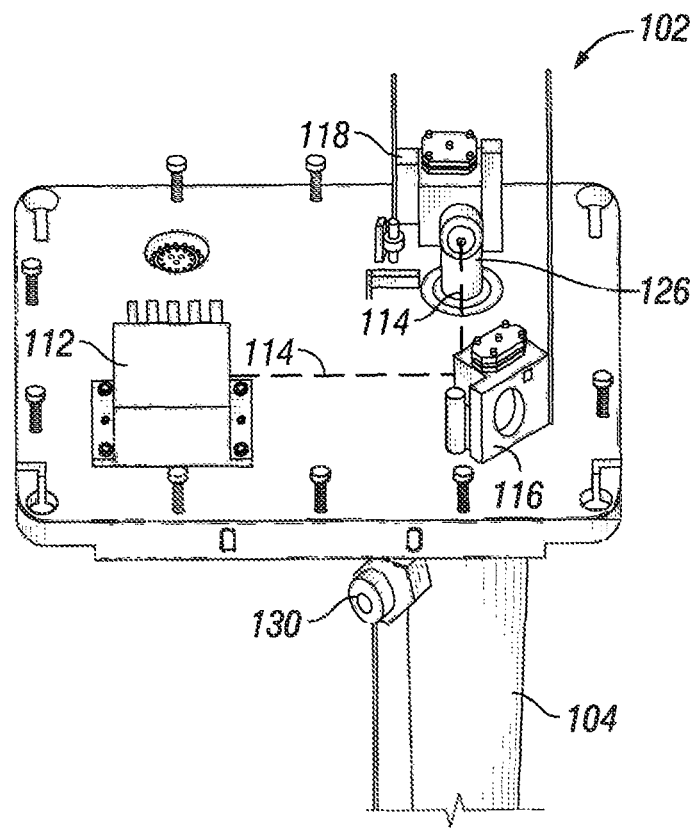

Referring to FIG. 1B, which shows sensing unit 100 with light source module housing 108 removed to reveal components in said light source module housing 108. Light source module 102 further comprises light source 112, which would be in light source module housing 108 when housing 108 is not removed from sensing unit 100. Light source 112 is configured to transmit an interrogation light beam along optical path 114 toward detector module 106.

One or more mirrors 116 and 118 may be used to create optical path 114 from light source module 102 toward detector module 106. The interrogation light beam is not shown in FIG. 1B since it would not be present if light source 112 and/or sensing unit 100 were not turned on. Optical path 114 can be configured as desired from light source 112 to sample cell 104 and eventually detector module 106, and the relevant components, such as light source 112 and optional mirrors 116 and 118, can be positioned accordingly to allow the interrogation beam to travel along optical path 114 when light source 112 transmits the interrogation light beam.

Figure 1C:
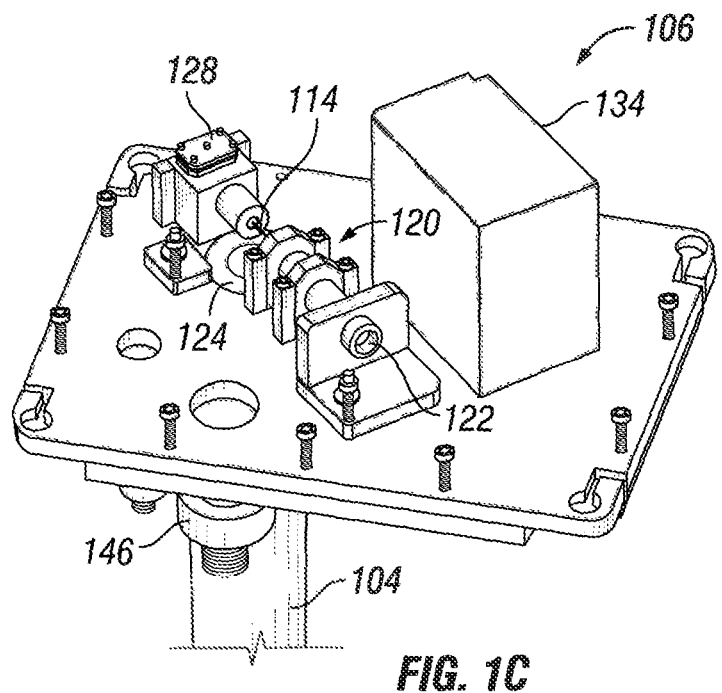

Reference is now made to FIG. 1C, which shows sensing unit 100 with detector module housing 110 removed to reveal components in detector module housing 110. Detector module 106 further comprises a separate reference cell 120, which may optionally be an in-line reference cell, and detector 122, both of which would be in detector module housing 110 when housing 110 is not removed from sensing unit 100. Reference cell 120 and detector 122 are positioned in optical path 114 extending from sample cell 104 through reference cell 120 toward detector 122. Similar to light source module 102, mirror 124 can be one option to allow reference cell 120 and detector 122 to be in optical path 114 extending from sample cell 104 through reference cell 120 toward detector 122. While not shown, it is understood that light source module 102, instead of detector 122, can comprise reference cell 120 where optical path 114 would travel through reference cell 120 first before entering sample cell 104. One of ordinary skill would understand that the light source module and the detector module may each be made of any one or a combination of suitable materials. Non-limiting examples of suitable materials including aluminum, nickel, cobalt, steel, glass coated plastic, and/or hybrid materials that are a combination of materials, such as alloys including but not limited to a nickel-cobalt ferrous alloy, or a silicon containing material, for instance as a coating for other material.

As shown in FIG. 1B, mirror 116 is a type of mirror that allows optical path 114 to make a right angle turn in the same plane parallel to light source 112. As shown in FIGS. 1B and 1C, mirrors 118 and 124 are a different type of mirror that allows optical path 114 to traverse between various planes, such as going from the plane parallel to light source 112 to a perpendicular plane as shown in FIG. 1B or vice versa as shown in FIG. 1C. It is understood that one of ordinary skill in the art would know how other ways to position the light source to transmit the interrogation light beam toward the sample cell. For instance, one of ordinary skill in the art can position the light source to transmit the light beam directly into the sample cell. Alternatively, one of ordinary skill in the art can position the light source in a way that uses one, two, three, or more mirrors or their equivalents to create an optical path toward the sample cell. One of ordinary skill in the art would know to select the number, type, and angle of the mirror to configure an optical path as desired with the desired number and type of angles.

Figure 2A:
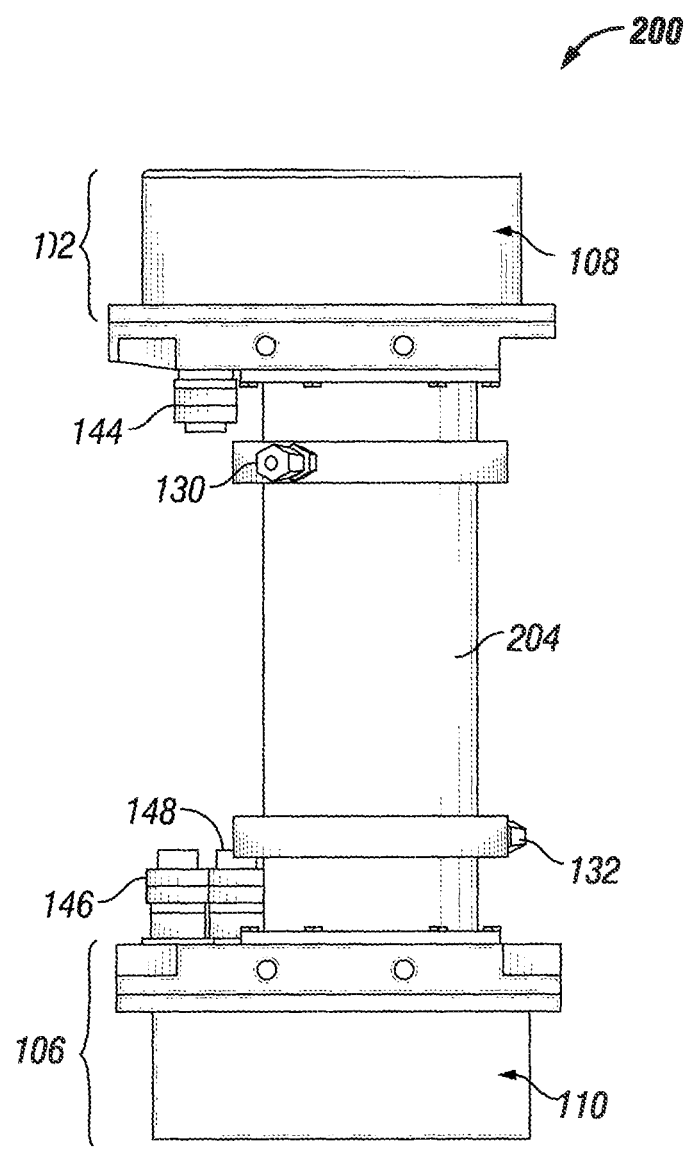
FIGS. 2A-2C depict various views of another exemplary sensing unit of the spectroscopic device as described herein, which comprises a multi-pass sample cell between a light source module and a detector module.
Figure 2B:
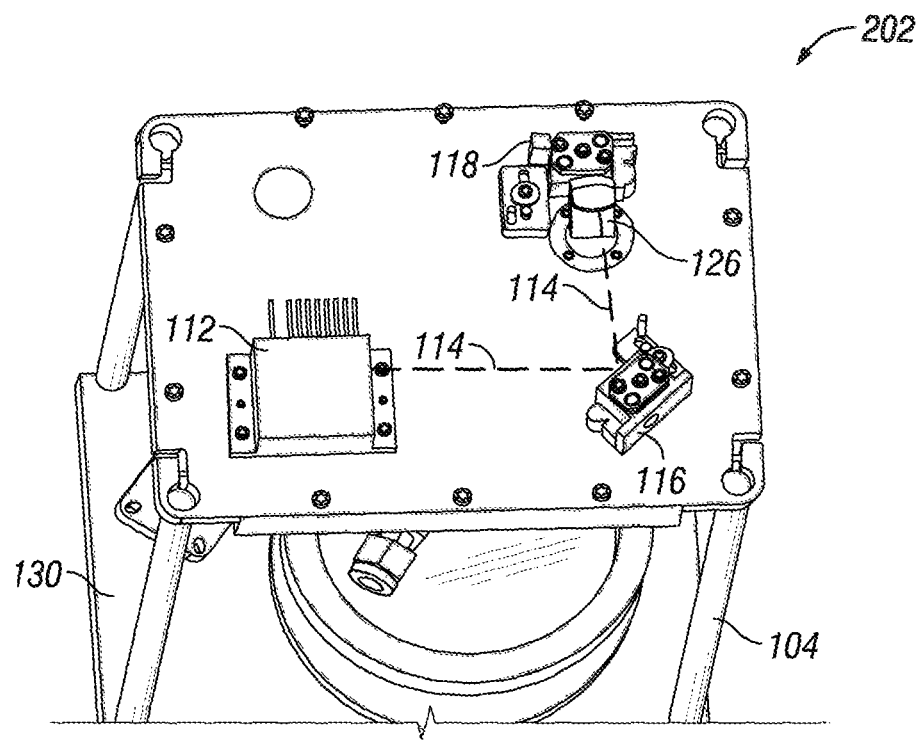
Figure 2C:
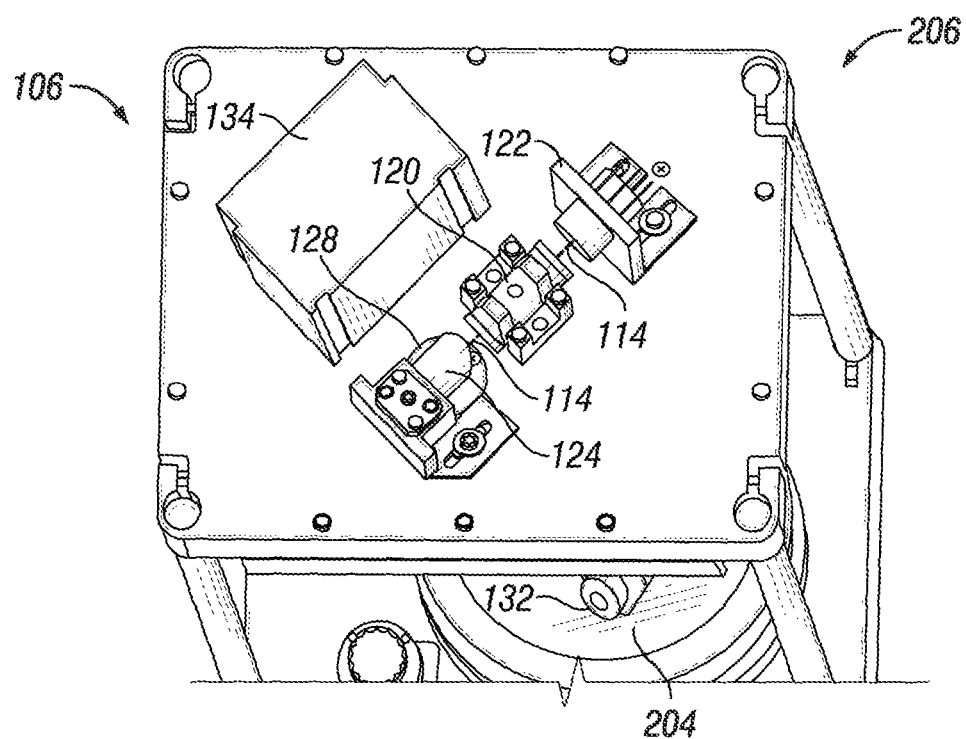
Figure 2D:
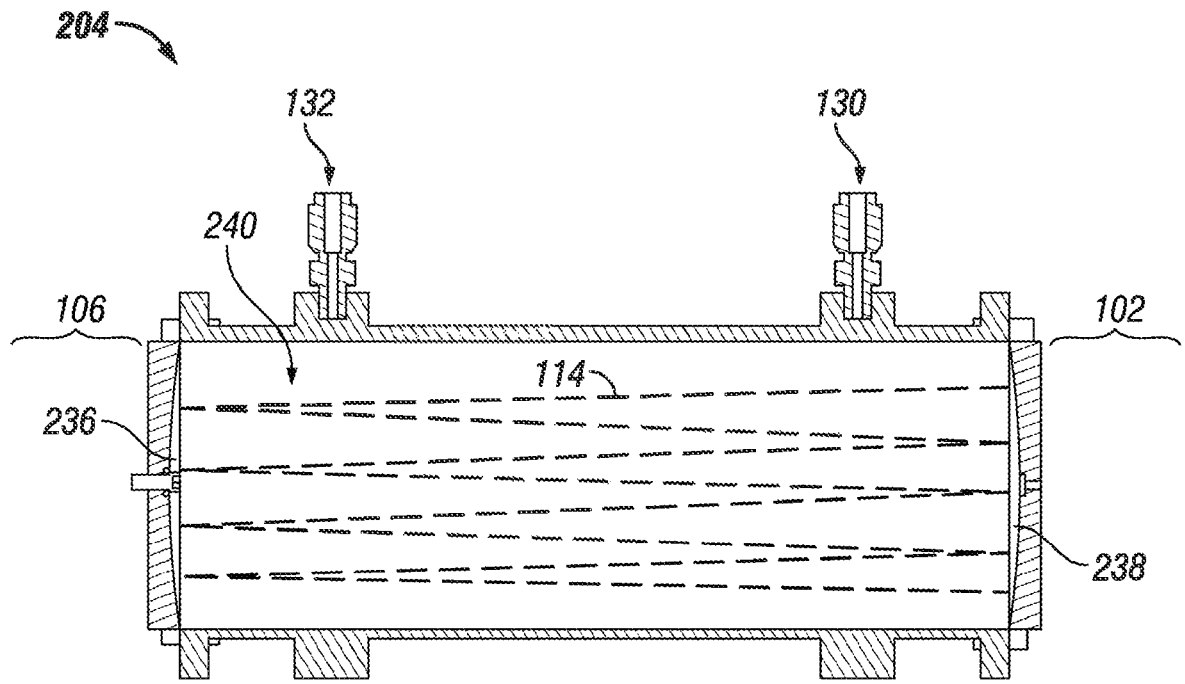
FIG. 2D depicts an exemplary multi-pass cell that may be used in the device of FIGS. 2A-2C.

Referring to FIG. 1A, sample cell 104 can comprise sample gas input port 130 and sample gas output port 132 to allow a sample gas to be introduced to sample cell 104. Sample gas input port 130 and sample gas output port 132 are preferably arranged relative to one another to achieve a desirable flowrate, such as an optimal flowrate for the size of the particular sample cell, which may be determined through routine means by one of ordinary skill. For instance, optionally, sample gas input port 130 and sample gas output port 132 can be positioned about 180 degrees from each other or they may be positioned about 0 degree from each other as shown in FIG. 2D, or any angle in between. As shown, sample gas input port 130 can be positioned closer to light source module housing 108 than detector module housing 110, and sample gas output port 132 can be positioned closer to detector module housing 110 than light source module housing 108. Optionally, sample gas input port 130 and sample gas output port 132 are configured to allow introduction of a gas sample from a system that is under high pressure, such as in hydrogen refueling stations where hydrogen is stored and delivered to the FCEVs at pressures ranging from little over atmospheric up to 1,200 bar.

When the spectroscopic device is in operation, the sample cell can contain a sample gas that may comprise one or more gas species of interest, where at least one gas species of interest in the sample cell is the same as one gas species of interest in the reference gas. The sample cell can contain a sample gas that may comprise two or more gas species of interest, where at least one gas species of interest that may be in the sample cell is the same as one gas species of interest in the reference gas. The sample gas in the sample cell may be hydrogen gas that can from time to time contain the one or two or more gas species of interest, the concentration of which may be determined by the spectroscopic device described herein. The reference gas can be configured to comprise a known concentration of at least some of the same gas species of interest under a certain optical path length to generate a reference absorption that is representative of the absorption generated by the concentration near or above the limit of the one or more gas species of interest in the sample cell. The hydrogen gas can have a purity of at least 99%. The one or two or more gas species of interest in the sample cell and/or the reference gas may include, but is not limited to, any one or any combination of hydrogen sulfide ($H_2S$), hydrogen chloride (HCl), hydrogen fluoride (HF), ethane ($C_2H_6$), ethylene ($C_2H_4$), acetylene ($C_2H_2$), formaldehyde ($CH_2O$), methane ($CH_4$), nitric oxide (NO), nitrous oxide ($N_2O$), sulfur dioxide ($SO_2$), carbon monoxide (CO), methane ($CH_4$), water vapor ($H_2O$), and ammonia ($NH_3$). The species of interest may also include specific isotopes of various elements. For example, it may be desirable to know the $^{13}C/^{12}C$ ratio in $CO_2$ or CO.

Since different species of interest will have different absorption bands located from visible to long IR range, depending on the selection of wavelengths and availability of lasers, one can get different sensitivity with different cost associated. In certain embodiments, the lower detection limit (LDL) is wavelength, pathlength and average time related. Shown below is a table of LDLs of various species for one embodiment.

| Species | Lower Detection Limit (LDL) |
| --- | --- |
| Acetylene | 20 ppb |
| Ammonia | 1 ppb |
| Carbon dioxide | 5 ppm |
| $^{13}C/^{12}C$ ratio in CO2 | 0.18% (precision) |
| Carbon monoxide | 1 ppb |
| Ethane | 3 ppb |
| Formaldehyde | 3 ppb |
| Methane | 5 ppb |
| Nitric oxide | 2 ppb |
| Nitrous oxide | 0.5 ppb |
| Water | 1 ppm |
| Sulfur dioxide | 10 ppb |

When the spectroscopic device is not in service (such as being in transit from one location to another, not connected to a system, not in operation, or the like), the sample cell can be optionally at ambient conditions. During operation, it can have an operating temperature in a range of about −30° C. to about +40° C. and/or an operating pressure at which the absorption spectral width can sufficiently be captured by the laser scan range. For instance, the operating pressure of the spectroscopic device can be in a arrange of up to 30% below ambient pressure (about 1 bar) to up to 30% above ambient pressure. The gas sample may be provided continuously as a sample gas stream or non-continuously as discrete amounts through the sample cell, such as via ports 130 and 132.

As shown in FIGS. 1A-1C, sample cell 104 of sensing unit 100 is a single-pass sample cell, where the optical path length is similar to the cavity length of sample cell 104. Optionally, as shown in FIGS. 2A-2C, the spectroscopic device described herein can comprise a multi-pass sample cell, sample cell 204, where the optical path travels through the sample cell multiple times, thereby resulting in an optical path length that is likewise multiple times longer than the cavity length of the sample cell. In general, selection of a path length depends at least on the spectral properties of a gas species. In particular, a gas species typically has absorption features that can be probed and detected at certain wavelengths, which can be used to determine its concentration. For example, the concentration of a gas species, such as carbon monoxide (CO), in a gas sample containing hydrogen or nitrogen, can be determined because carbon monoxide absorbs the interrogation light beam of certain wavelengths, and hydrogen or nitrogen does not, so the concentration of carbon monoxide present in the gas sample can be selectively measured by measurement of the transmission of the light beam through the sample cell at wavelengths absorbed by carbon dioxide (e.g., the absorption signal).

In general, the path length can be chosen using the Beer-Lambert Law, which describes a relationship between light behavior and concentration of a compound. One way of calculating a path length for the sample cell is to adapt the Beer-Lambert Law to take into consideration the minimum detectable absorbance particular to a system, the absorption cross-section, the concentration range to be detected of the gas species of interest in the sample gas, and the averaging time of the measurement in the following equation:

$$L = A_{min}/(N^* \sigma^* \sqrt{t_{avg}})$$

where L is the path length of the sample cell, $A_{min}$ is the minimum detectable absorption by a particular spectroscopic detection system, N is the molecular concentration to be detected of a gas species of interest, σ is the molecular absorption cross-section, and $t_{avg}$ is the averaging time over which the absorption feature is probed. Because a spectroscopic detection system is calibrated with a known concentration of a reference gas species from which the concentration of the gas species of interest in the gas sample can be calculated, the spectroscopic detection system tends to provide more accurate readings when there is an estimate of the concentration range to be detected of the gas species of interest in the sample gas (N in the equation above). Otherwise, if the concentration of the gas species of interest in the sample gas deviates too far from this estimate, whether much higher or lower, the correlation of absorption signals with the reference gas species may become inaccurate. The molecular absorption cross-section, σ, which is particular for each gas species. For instance, HITRAN (Harvard-Smithsonian Center for Astrophysics) and GEISA (Gestion et Etude des Informations Spectroscopiques Atmospheriques) spectra databases contain molecular absorption cross-section information, which includes the strengths and shapes (wide band vs. narrow band), of various gas species at different wavelengths. The type of light source often determines the molecular cross-section to be probed. For instance, if the light source selected is configured to probe at wavelength 4300 nm, then the molecular absorption cross-section of a gas species of interest at 4300 nm will be used. Typically, the molecular absorption cross-section that contains the strongest absorption features, and hence the most sensitive absorption features to be probed, are selected. Nevertheless, absorption lines of weaker line strength are sometimes used due to other factors, such as light source availability, interferences from other gas species absorption in a given spectral region, the ability to probe multiple absorption features with one light source, and/or light source and detector costs.

For a gas species like carbon monoxide or water vapor, a sample cell path length of at least 10 cm, optionally in a range of 10-50 cm, can be suitable to generate absorption signals of adequate strength for detection and calculation of the concentration of a gas species of interest in the sample cell, particularly due to its anticipated concentration in a gas sample and strong absorption line strength. For instance, a spectroscopic device with a single-pass sample cell as described herein, such as unit 100, is particularly suitable for use in measuring the concentration of at least one of carbon monoxide (CO) and water vapor ($H_2O$) in a gas sample containing mostly hydrogen, optionally with purity of greater than 99%, where sample cell 104 may have a cavity length of at least 10 cm, optionally in a range of 10-50 cm. Optionally, such spectroscopic device with a single-pass sample cell configured to detect CO and $H_2O$ can have a light source configured to probe for an absorption feature at a wavelength in a range of 1000 nm to 8000 nm. It is understood that the single-pass sample cell can be configured to measure other gas species of interest other than CO and $H_2O$, where the optical path length of the single pass optical cell can be in a range of 0.1 m to 1000 m, preferably 0.1 m to 5 m. For such a relatively short path length, the sample cell can be a single-pass optical cell going from the light source to the detector.

If the gas sample contains hydrogen sulfide ($H_2S$) instead of, or in addition to, carbon monoxide (CO), then a longer optical path length (such as at least 1 meter to up to 200 m) for the sample cell may be needed to generate a strong absorption signal to analyze the concentration of hydrogen sulfide ($H_2S$) in comparison to a certain concentration limit, such as that imposed by the International Organization for Standardization.

As noted above, the length of the optical cavity of a single-pass optical cell is effectively the length of the optical path through that cell. For relatively short path lengths, a single-pass optical cell is often preferred due to its simplicity, such as in its design, alignment procedures, and manufacturing. For longer path lengths, however, the increase in cavity length, and hence increase in size of the cell, may no longer be worth the simplicity the single-pass optical cell affords, and multi-pass optical cells are often preferred in such scenarios. A multi-pass cell directs the optical path through the cavity of the optical cell multiple times before it exits, thereby extending the optical path length beyond the physical length of the optical cavity. As such, the cross-sectional surface area of a multi-pass optical cell is usually larger than that of a single-pass optical cell. While multi-pass optical cells may be more complex to design, align, and fabricate, and may involve more complicated, complex, and costly optical components, its space-saving capability can outweigh its complexities in certain scenarios, and it is within the knowledge of one of ordinary skill in the art to select between a single-pass optical cell and a multi-pass optical cell based on desired design premises of a device or system.

As such, according to another aspect, instead of having the sample cell between the light source and detector, the spectroscopic device described herein can have a combined module comprising both the light source and detector, which may be referred to as the light-source-and-detector module. In such case, the sample cell may be between the light-source-and-detector module and one or more mirrors configured to direct the optical path back through the sample cell toward the light-source-and-detector module, where the sample cell may optionally comprise one or more mirrors that create multiple reflections in the optical path therein (e.g., a multi-pass optical cell) prior to the optical path being directed toward the detector in the light-source-and-detector module. Accordingly, the present disclosure also provides a spectroscopic device comprising a light-source-and-detector module; and a sample cell, where the light-source-and-detector module comprises a light-source-and-detector module housing, a reference gas, a detector, and a light source configured to transmit an interrogation light beam along an optical path that travels through the reference gas and one or more times through the sample cell toward the detector; and where the light source, the reference gas, and the detector are in the light-source-and-detector module housing.

Referring to FIGS. 2A-2C, sensing unit 200 comprises sample cell 204, which can be a multi-pass optical cell. The other components in FIGS. 2A-2C can be the same as those in FIGS. 1A-1C, so they have the same number reference, and the descriptions associated with those numbers provided herein, including for FIGS. 1A-1C are applicable to FIGS. 2A-2C and need not be repeated. Multi-pass optical cells are known to one of ordinary skill in the art and can include the use of a pair of spherical mirrors, cavity-enhanced methods, integrating spheres, or astigmatic cells. It is within the knowledge of one of ordinary skill in the art to design and/or select a multi-pass optical cell to achieve a desired optical path length.

In particular, FIG. 2D depicts one option that can be used for multi-pass optical cell 204 where a pair of spherical mirrors 236 and 238 are used to extend the path length of optical path 114 through cavity 240 of sample cell 204. In FIG. 2D, optical path 114 enters cavity 240 of sample cell 204 from light source module 102 and goes back and forth between mirrors 236 and 238 for a predetermined amount of time until it exits and enters detector module 106. Also, FIG. 2D depicts an option where sample input port 130 and sample output port 132 are not positioned 180 degrees apart from each other. It is understood that other types of multi-pass optical cell can be used as sample cell 204, and it is within the knowledge of one of ordinary skill in the art to make such a selection.

Figure 3D:
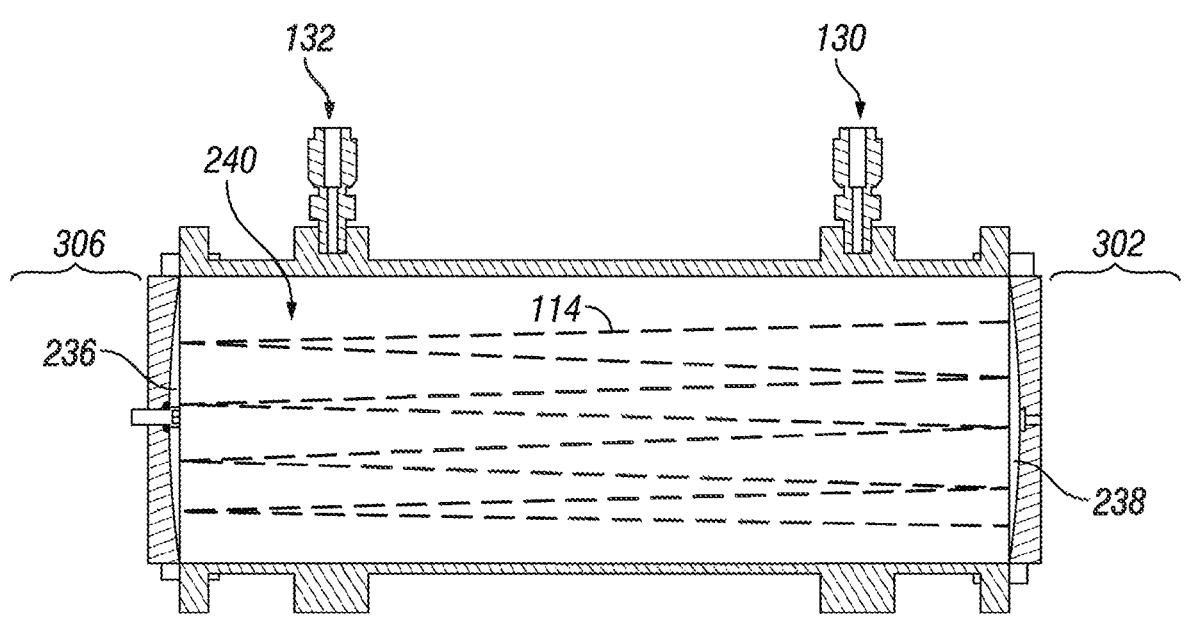
FIG. 3D depicts an exemplary multi-pass cell that may be used in the device of FIGS. 3A-3C.
Figure 3A:
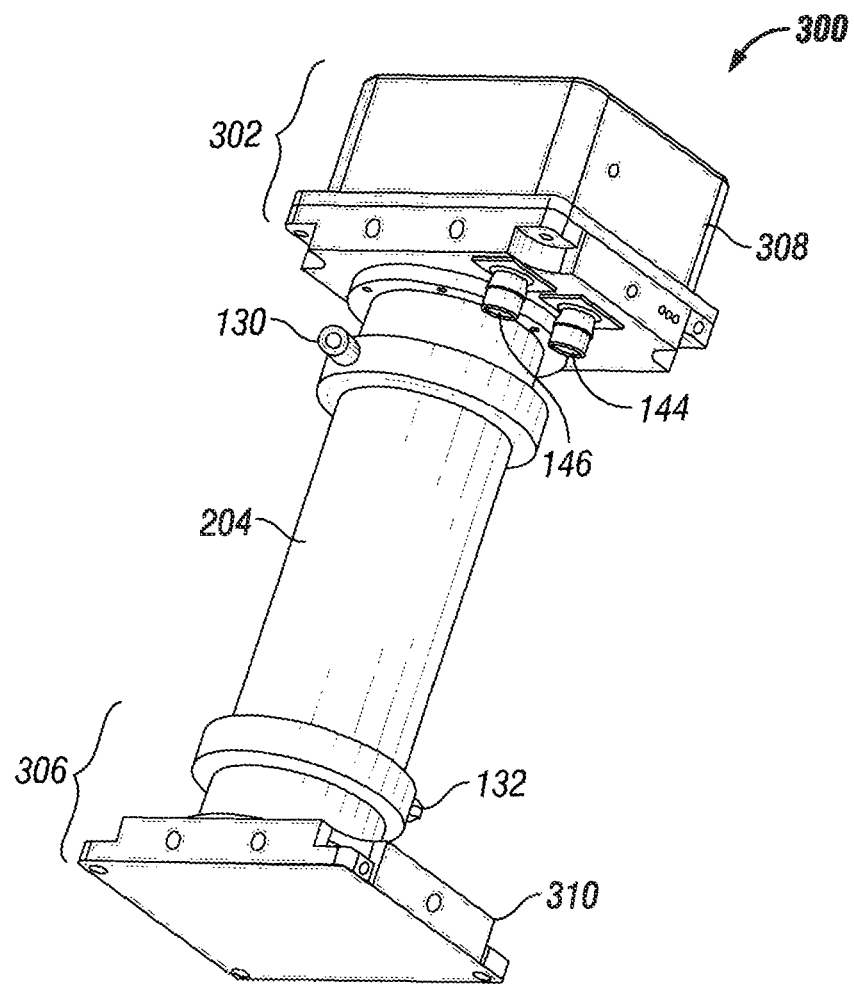
FIGS. 3A-3C depict various views of another exemplary sensing unit of the spectroscopic device as described herein, which comprises a multi-pass sample cell between a light-source-and-detector module and a flange module.

Optionally, the use of a multi-pass optical cell, including a dual-pass optical cell, can allow for the light source, reference gas, and detector to be located on the same side of the sample cell. Referring to FIG. 3A, sensing unit 300 comprises light-source-and-detector module 302, flange module 306, and sample cell 204 between light-source-and-detector module 302 and flange module 306. light-source-and-detector module 302 comprises light-source-and-detector module housing 308, and flange module 306. Sample gas input port 130 can be positioned closer to light-source-and-detector module housing 308 than flange module 306, and sample gas output port 132 can be positioned closer to flange module housing 310 than light-source-and-detector module housing 308.

Figure 3B:
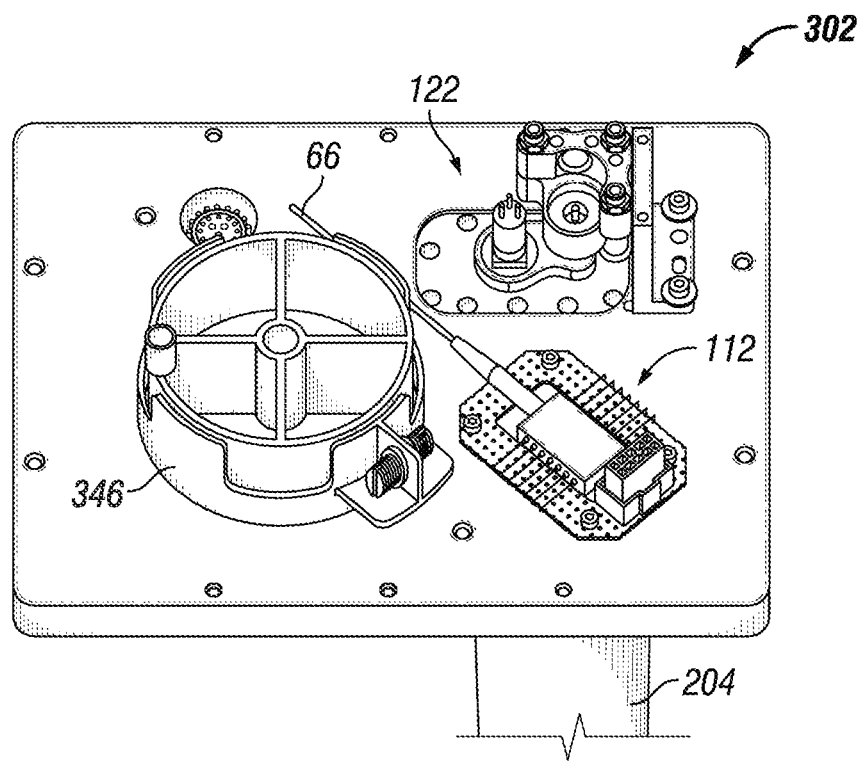
Figure 3C:
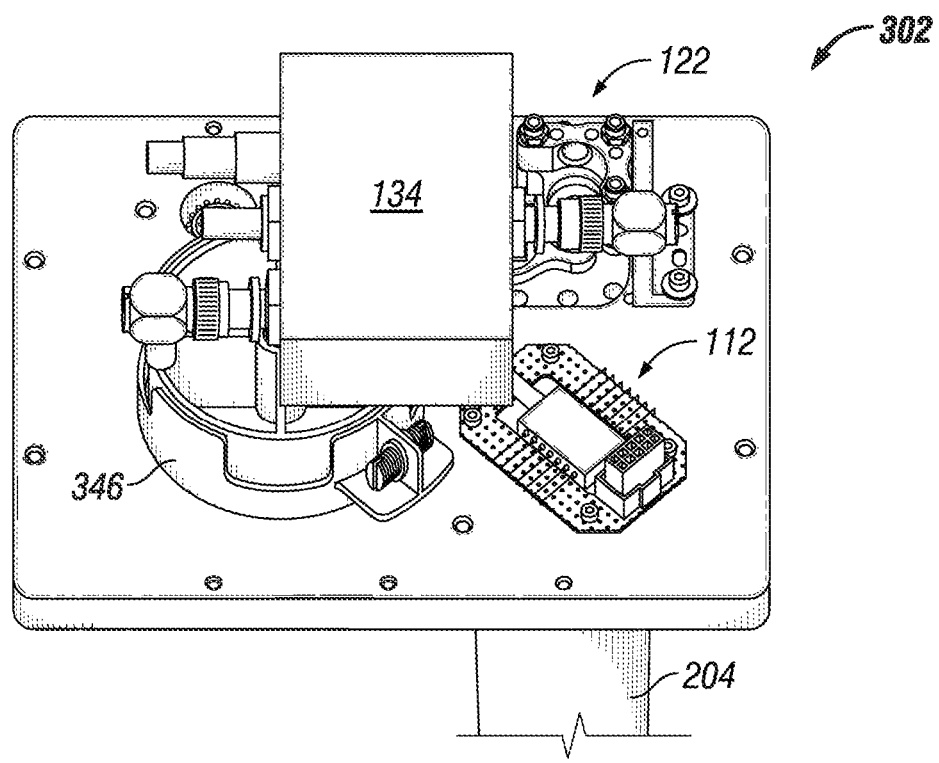

Reference is now made to FIG. 3B, which shows sensing unit 300 with light-source-and-detector module housing 308 removed to reveal components in light-source-and-detector module housing 308. As shown, light-source-and-detector module 302 further comprises light source 112, a reference gas (not shown), and detector 122. Light source 112 is configured to transmit an interrogation light beam along an optical path (not shown) that travels through the reference gas and one or more times through sample cell 204 toward detector 122. FIG. 3B illustrates one option to allow the interrogation light beam to be directed along an optical path toward sample cell 204, which is directly from light source 112 to sample cell 204. As shown in FIG. 3B, mirrors are not used to configure the optical path between light source 112 and sample cell 204, which in contrast to FIGS. 1B-1C and 2B-2C showing the use of mirrors 116, 118, and 128. Thus, while the optical path is not explicitly depicted, it is understood that one is present from light source 112 to sample cell 204. FIG. 3C shows a similar view of sensing unit 300 as that in FIG. 3B except now with preamplifier 134, additional details of which are provided further below. Optionally, certain components such as the detector and/or reference cell may be held in place by fastener 346 or any other suitable fastener or coupler.

Referring to FIG. 3A, depending on the type of optical cell selected for sample cell 204, flange module 306 can optionally comprise support component 310, such as an end plate, for support and/or to facilitate integration or fastening to other parts of a system. In particular, sample cell 204 of FIGS. 3A-3B can be a multi-pass cell depicted in FIG. 2D where optical path 114 enters cavity 240 from the light-source-and-detector module (not shown) and bounces back and forth between mirrors 236 and 238 until it exits and returns to the detector (not shown) in the light-source-and-detector module. The reference gas (not shown) and detector 122 are positioned in the optical path coming back through sample cell 204 and the reference gas (not shown) toward detector 122. FIG. 3B shows one option to position the reference gas and detector 222 in the optical path coming back through sample cell 204, which is directly from sample cell 204 through the reference gas toward detector 122. As shown, mirrors are not used to configure an optical path between sample cell 204 and detector 122. Thus, while the optical path is not explicitly depicted, it is understood to be present from light source 112 to sample cell 204. Although the use of one or more mirrors, such as that shown in FIGS. 1B-1C and 2B-2C, can be implemented for sensing unit 300 if desired, it may be as preferable to employ the configuration shown in FIG. 3B because each additional component, such as a mirror, would take up space, which may cause housing 308 to be larger than desired. Cost of components, such as a particular light source or mirror, and preferred ranges of device size can be two of various factors known to one of ordinary skill in the art that may influence whether mirrors are used and/or the configuration of the optical path.

Figure 4A:
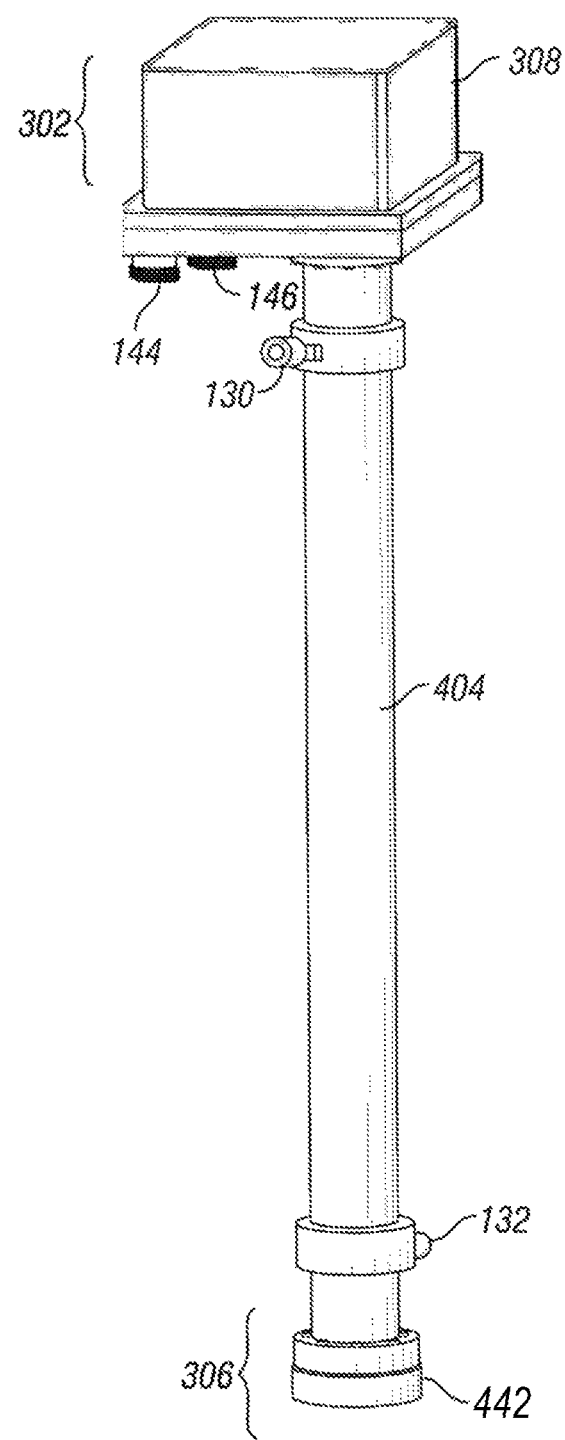

Optionally, the sample cell of sensing unit 300 can be a particular type of multi-pass cell: a dual-pass optical cell, where the optical path goes through the sample cell more than once, specifically twice. For instance, the multi-pass optical cell depicted in FIG. 2D can be configured to have only one mirror 236, and not mirror 238, where optical path 114 enters cavity 240 and bounces off of mirror 236 back to light-source-and-detector module 302. Another option for a spectroscopic device with a dual-pass optical cell is depicted in FIGS. 4A-4C where sensing unit 400 is similar to sensing unit 300 shown in FIGS. 3A-3C, except it comprises sample cell 404, which does not contain a mirror to direct the optical path back to light-source-and-detector module 302. Instead, flange module 306 can comprise one or more mirrors 442 that are coupled to sample cell 404 and configured to direct the optical path back to light-source-and-detector module 302. As such, sample cell 404 can be similar to a single-pass cell, such as that shown in FIG. 1A, but with the benefit of a slightly longer path length. The use of a dual-pass optical cell, particularly as one depicted in FIG. 4A, may be preferable as it (i) allows for co-location of the light source, reference gas, and detector on one side, which can provide for a device with smaller footprint and which is thus more cost effective; and (ii) provides a longer path length than a single-pass optical cell; yet still enjoys the simplicity mentioned above associated with a single-pass optical cell. Spectroscopic devices that comprise a single-pass sample cell or dual-pass sample cell, such as unit 100 or 400, are particularly suitable for use in optical sensing of a gas sample containing one gas species of interest, such as carbon monoxide, carbon dioxide, water vapor, or methane. Spectroscopic devices that comprise a multi-pass sample cell, such as unit 200 or 300, are particularly suitable for measuring a gas sample containing more than one gas species of interest, such as when using one light source that is configured to probe for two or more gases, including carbon monoxide and water vapor, due to increased complexities associated with probing multiple gas species that may require longer path length for the sample cell. Optionally, the reference gas sample may comprise more than one reference gas species.

As an alternative or additional optional space- and cost-saving feature, the reference cell can be part of detector 122, where detector 122 comprises a detector cap that functions as the reference cell. More details regarding this optional feature of the spectroscopic device described herein are provided in the paragraphs below. While the reference gas is not explicitly depicted in FIG. 3B, it is understood to be present, whether as part of detector 122 or separately in other similar configurations.

Referring to FIGS. 1A, 2A, 3A, and 4A, while not necessary, it is preferred that light source module housing 108, detector module housing 110, and/or light-source-and-detector module housing 308 are sealed, hermetically or with other seals mechanisms that allows for a localized purged or pressurized environment, to prevent contamination from the environment, such as dirt or other gas that can impact the absorbance reading of the interrogation light beam traveling along optical path 114. Additionally, or alternatively, it is also preferred that sample gas in sample cell 104, if present, does not enter light source module housing 108 and/or detector module housing 110 for similar reasons, particularly if the sample gas is hydrogen gas, which can be highly reactive. As shown in FIGS. 1B-1C and 2B-2C, one option to achieve a sealed environment and still allow for optical path 114 to continue from light source module housing 108 through sample cell 104 and into detector module housing 110 is with one or more light transmission windows. In particular, light source module 102 can comprise a first light transmission window 126 to allow optical path 114 from light source module 102 to continue to sample cell 104, and detector module 104 can comprise a second light transmission window 128 to allow optical path 114 from sample cell 104 to continue to detector module 106.

Similarly, referring to FIGS. 3B, light-source-and-detector module 302 can comprise a first light transmission window (not shown) to allow the optical path from light-source-and-detector module 302 to extend to sample cell 404 and a second light transmission window (not shown) to allow the optical path from sample cell 404 back to light source and detector 302 module. Optionally, the light source that may be fiberized as further described below with respect to FIG. 7 where a culminator (or culminating lens) combines the light from the fiber(s) into an interrogation beam that can go directly into the sample cell without use of a light transmission window, although such a window may be used if desired. For instance, as shown in FIG. 3B, light source 112 can transmit the interrogation light beam from fiber 66 (further described below with respect to FIG. 7), which may be inserted directly into sample cell 204 or the interrogation light beam may travel through a first transmission window. Detector 122 can be positioned over a separate second light transmission window (thereby covering it so it is not shown in FIG. 3B) through which the optical path coming back from sample cell 404 extends to detector 122. Additionally, or alternatively, if light transmission windows are used, the first light transmission window and the second light transmission window can be the same window.

As another alternative or additional optional space- and cost-saving feature, at least one of the first light transmission window can be part of the light source 112 and the second light transmission window can be part of detector 122, instead of the respective window being a separate component as shown in FIGS. 1B-1C and 2B-2C. More details regarding this optional feature of the spectroscopic device described herein are provided in the paragraphs below.

The following descriptions, as well as other relevant descriptions elsewhere in the present disclosure, regarding optional features are applicable to the spectroscopic device as described herein, including but not limited to sensing units 100, 200, 300, and 400.

The first and/or second window of the spectroscopic device described herein can comprise any suitable light transmission windows known to one of ordinary skill in the art, which are typically configured to minimize fringe patterns and/or internal reflections. One option to minimize the fringe patterns and/or internal reflections is use of an anti-reflection coating on the window. Additionally, or alternatively, a light transmission window with a wedged side can be used, which may be referred to as a wedged window. In sum, a suitable light transmission window can be any combination of a window with both sides flat or one side wedged and the other side flat, where the sides can, but not necessarily, have anti-reflection coating as well. Availability, cost, and/or performance of a particular light transmission window can be one or more factors that are considered in selecting the type of window (wedged vs. flat and/or anti-reflection coating). FIGS. 5A-5C illustrate various views of an exemplary wedged window that can be used as the first and/or second window of the spectroscopic device described herein. In particular, FIG. 5A is a perspective view of the wedged window on its side; FIG. 5B is a perspective view with the wedged window on its flat surface; and FIG. 5C is a side cross-sectional view of the wedged window showing angle 502 of wedged surface 504 with respect to flat surface 506. Angle 502 can be any suitable angle ranging from 1 degree and up to 45 degrees for wedged surface 504, preferably from 2 degrees to 15 degrees. If the window is flat, then it is understood this angle would be 0 degree. It is within the knowledge of one of ordinary skill in the art to select a window with an appropriate angle, which may take into consideration various factors such as the cost, performance, and specification (size, thickness, etc.) of available light transmission windows. It is understood that the first and/or second window can have any suitable shape, although round or circular is preferred as this is usually the shape of commercially available light transmission windows.

It is within the knowledge of one of ordinary skill in the art to select a suitable material for the first and/or the second light transmission window, which can include available material such as sapphire, calcium fluoride ($CaF_2$), silica (preferably UV fused), magnesium fluoride ($MgF_2$), barium fluoride ($BaF_2$), N-BK7 (a RoHS-compliant borosilicate crown glass), zinc selenide (ZnSe), silicon (Si), germanium (Ge), KRS-5 (thallium bromoiodide), and any combination thereof. Similarly, it is within the knowledge of one of ordinary skill in the art to select a suitable size (surface area and thickness) for the first and/or the second light transmission window, where the surface area can be in a range of at least 0.5 $mm^2$ and up to 30 $mm^2$ and/or the thickness can be in a range of at least 0.01 mm and up to 10 mm. Factors that can influence the size selection include the type of light source (and thus interrogation beam), transmission coefficient of the window material, the beam collimation, mirror focal lengths, beam size, and pressure of the sample cell, particularly when it contains sample gas.

The light source of the spectroscopic device described herein can produce an interrogation light beam having an excitation wavelength. In particular, the light source can be a coherent light source, which may be tuned across a desired range of the spectrum, preferably in the infrared (IR) region. Preferably, the light source is configured to probe for an absorption feature at a wavelength in a range of 700 nm to 25000 nm. It is understood that one of ordinary skill can select one or more suitable wavelengths for the light source based at least on the relative spectral properties of the particular gas species of interest being measured. For instance, ammonia has absorption features at wavelengths at least in the range of 8500 nm to 10,500 nm; methane has absorption features at wavelengths at least in the range of 1600 nm to 1700 nm or in the range of 3200 nm to 3400 or around 2300 nm; carbon monoxide has absorption features at wavelengths at least in the range of 2200 nm to 2400 nm or in the range of 4000 nm to 5000 nm; $H_2S$ has absorption features at wavelengths at least in the near IR or mid-IR region, such as 2000 nm to 3000 nm and 7000 nm to 9500 nm; and water vapor has absorption features at wavelengths at least around 1400 nm, 1850 nm, 2600 nm, 2700 nm, and 5000 nm to 7000 nm.

The coherent light source can comprise at least one of a quantum cascade laser, an interband cascade laser, a vertical cavity laser, and a semiconductor laser a vertical cavity interband cascade laser, a vertical cavity quantum cascade laser, and a distributed feedback (DFB) laser, and/or a light emitting diode. It is understood that one of ordinary skill can select one or more suitable wavelengths for the light source based at least on the spectral properties of the particular gas species of interest being measured.

Figure 6:
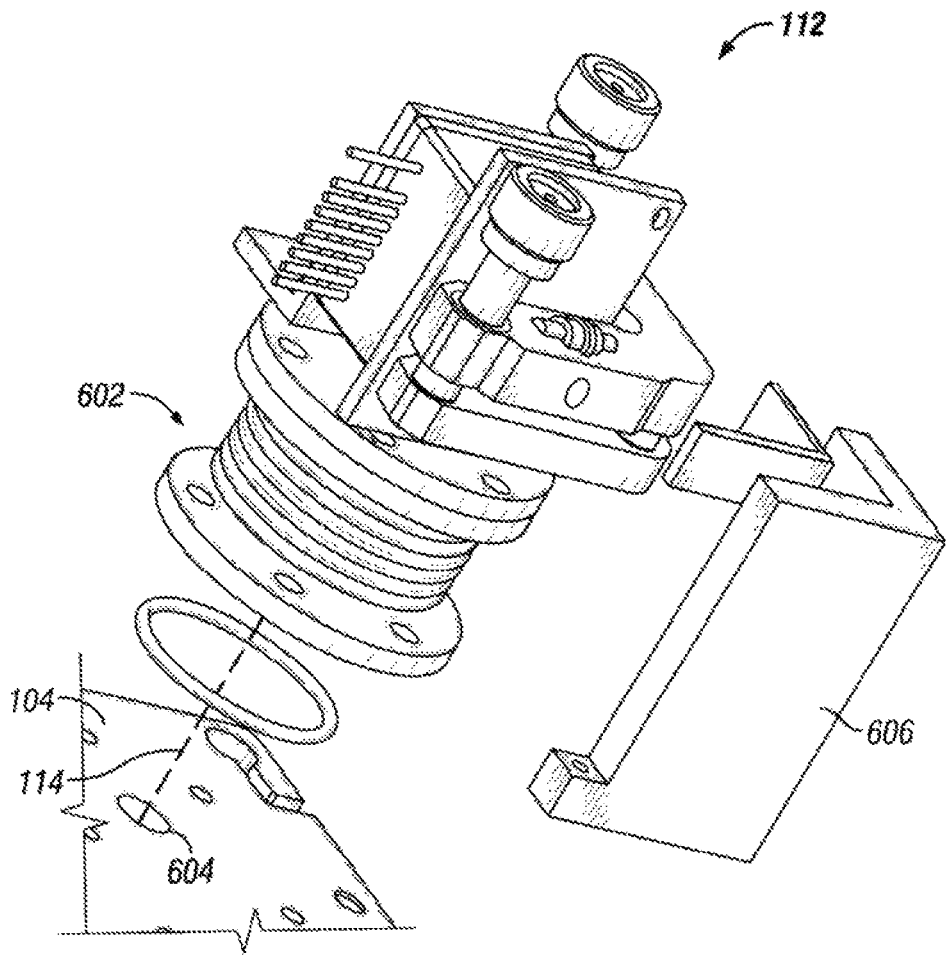
FIG. 6 depicts an exemplary light source that may be used in the spectroscopic device as described herein.
Figure 7:
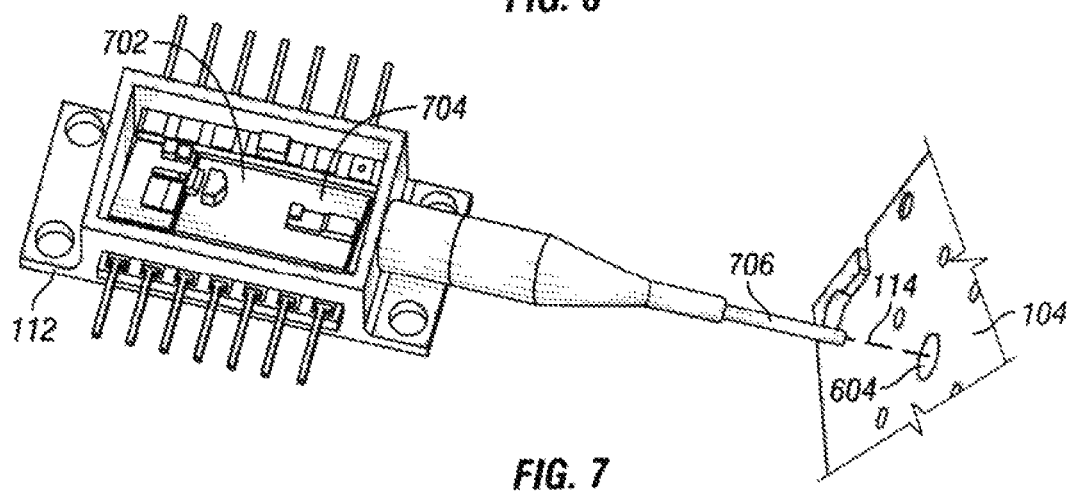
FIG. 7 depicts another exemplary light source, which comprises optic fiber, that may be used in the spectroscopic device as described herein.

FIG. 6 depicts one option for the light source of the spectroscopic device of the present disclosure, including light source 112 depicted in FIGS. 1B and 2B. FIG. 7 depicts another option for the light source, including light source 112 depicted in FIG. 3B. It is understood that the light source in FIG. 6 may also be used for unit 300 or 400 and the light source in FIG. 7 may be used in unit 100 or 200, as well as any other suitable light source as described herein. FIG. 6 shows an exemplary coherent light source, specifically a quantum cascade laser (QCL). As shown in FIG. 6, light source 112 can have body 602 that allows it, in one option, to transmit an interrogation beam along optical path 114 extending directly into a sample cell, such as sample cell 104, rather than bouncing off one or more mirrors before entering the sample cell. While sample cell 104 is depicted, the sample cell in FIG. 6 can be any other suitable sample cell, including sample cell 204 or 404. As shown, sample cell 104 has opening 604 to allow optical path 114 to enter. Opening 604 can comprise the first light transmission window as described above to allow entry of optical path 114 into sample cell 104 while maintaining seals in the light source module housing and/or the light-source-and-detector module housing, as well as sample cell 104. Alternatively, or additionally, the side of body 602 that faces sample cell 104 can comprise the first light transmission window; hence, light source 112 can comprise the first light transmission window. Mounting assembly 606 allows light source 112 to be fastened in place at the light source module.

FIG. 7 illustrates an exemplary fiberized coherent light source, particularly a distributed feedback laser. As shown in FIG. 7, light source 112 can comprise collimation optics 702, fiber coupling 704, and single-mode (SM) or multimode (MM) fiber 706. Light source 112 of FIG. 7 can be mounted at the light source module or the light-source-and-detector module as shown in FIG. 3B. The end of fiber 706 can comprise a fiber collimator device that extends into the sample cell and deliver the light. The interface between the collimator device and the sample cell can be sealed, such as by welding, gaskets, or o-rings. If the light source as described herein comprises a fiberized coherent light source, the sensing unit of the present disclosure can comprise a transmission window that is not part of the light source. While the figures depicts the use of one light source in the spectroscopic device, it is understood that the spectroscopic device described herein can be equipped with two or more light sources, particularly to measure the concentration of two or more gas species of interest in the gas sample where one light source can be configured to scan in the spectral region specific to one gas species of interest while another light source is configured to scan the active spectral region of another gas species. Optionally, one light source can be configured to scan two or more spectral regions of two or more gas species as well.

The reference gas, whether in a separate reference cell or not, can comprise one or more gas species of interest, which optionally can include any one or any combination of hydrogen sulfide ($H_2S$), carbon monoxide (CO), methane ($CH_4$), water vapor ($H_2O$), and ammonia ($NH_3$). The reference gas can comprise two or more gas species of interest to be detected. Preferably, the reference gas contains carbon monoxide as a reference gas species of interest when detecting for carbon monoxide and/or water vapor as the gas species of interest in the gas sample due to the strong spectral features of carbon monoxide as compared to that of water vapor, particularly around wavelengths in a range of 4782 nm to 4785 nm. If methane and water vapor are at least the gas species of interest being detected and measured in the gas sample, methane is preferably used as a reference gas species of interest in the reference gas because methane has strong spectral features compared to water vapor, particularly around the wavelengths in a range of 3270 nm to 3272 nm. If hydrogen sulfide, methane, or ammonia are at least the gas species of interest being measured in the gas sample, the species of interest may be ammonia or methane in the range of 8000-8200 nm.

There is a general correlation between absorbance of the reference gas species ("reference absorbance"), the path length of the reference cell, and the concentration of the reference gas species, based on the Beer-Lambert law, so the concentration of the gas species of interest in the gas sample can be calculated by comparing the absorbance of the gas species of interest in the sample cell to the reference absorbance. As such, the reference cell (whether as a separate cell or part of the detector or some other component) contains a known concentration of the reference gas species of interest for a given path length of the reference cell. Assuming a path length in a range of about 2 cm for the reference cell, the concentration of the one or two or more gas species of interest in the reference cell can be a known concentration, which optionally can be at least 0.1% to 5%. In general, the spectral properties of a gas species behave different at ambient pressures as compared to reduced pressures that are lower than ambient pressures, particularly, the line width of absorption features narrow due to reduced pressure-broadening. It is desirable to have a reference cell that has a total pressure of at least ten times below ambient pressure and the sample cell at or above ambient pressure to generate a reference absorption feature that is narrower than a sample absorption feature. The concentration of a gas species of interest in a reference gas is typically in the range of 100 parts per million to percentage levels. The exact concentration is targeted such that the absorption of the reference cell signal is about 10-100 times the absorption of the sample cell at the ISO limit. Concentrations less than this amount may result in noisier calibrations from the reference cell, while concentrations greater than 100 times the ISO limit may result in additional noise on the sample absorption signal. The reference cell can have a pressure that is below atmospheric pressure, which optionally can be in a range of 0.01 Torr to 100 Torr, or about 1.3 Pascal to about 13 Kilopascal. The pressure, or the partial pressure, of a gas species of interest in a reference gas may be in a range from about 0.01 atmospheres to about 0.5 atmospheres (or from about 1.01 kPascal to 50.66 kPascal), from about 0.03 atmospheres to about 0.3 atmospheres (or from about 3.04 kPascal to about 30.4 kPascal), or from about 0.05 atmospheres to 0.15 atmospheres (or from about 5.07 kPascal to about 15.2 kPascal) or may be about 0.1 atmospheres (or about 10.13 kPascal) or less.

Optionally, the reference gas contains the desired amount of reference gas species of interest and the remaining portion comprises one or more spectrally-inert gas species, such as nitrogen or argon, to achieve the desired pressure and concentration of the gas species of interest. A spectrally-inert gas species is one that minimally absorbs the interrogation light beam and therefore does not generate a strong absorption feature, such as one with peak absorptions less than 100 times the absorption of interest in the sample cell, at least in the spectral region of interest.

Figure 8A:
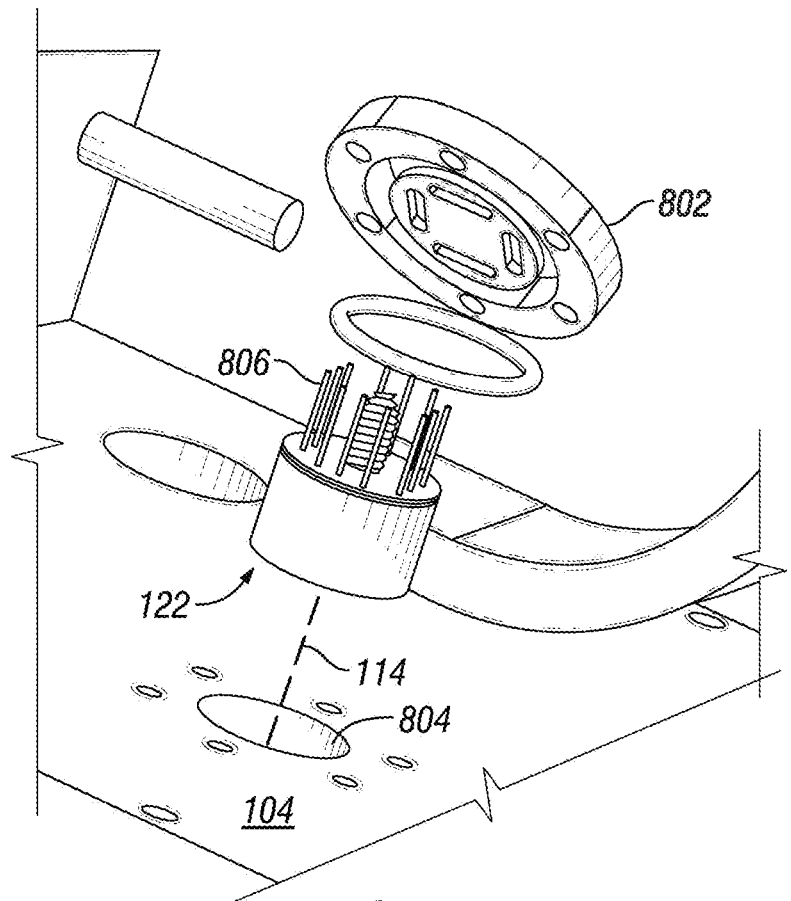
FIGS. 8A-8C depicts exemplary detectors that may be used in the spectroscopic device as described herein.
Figure 8B:
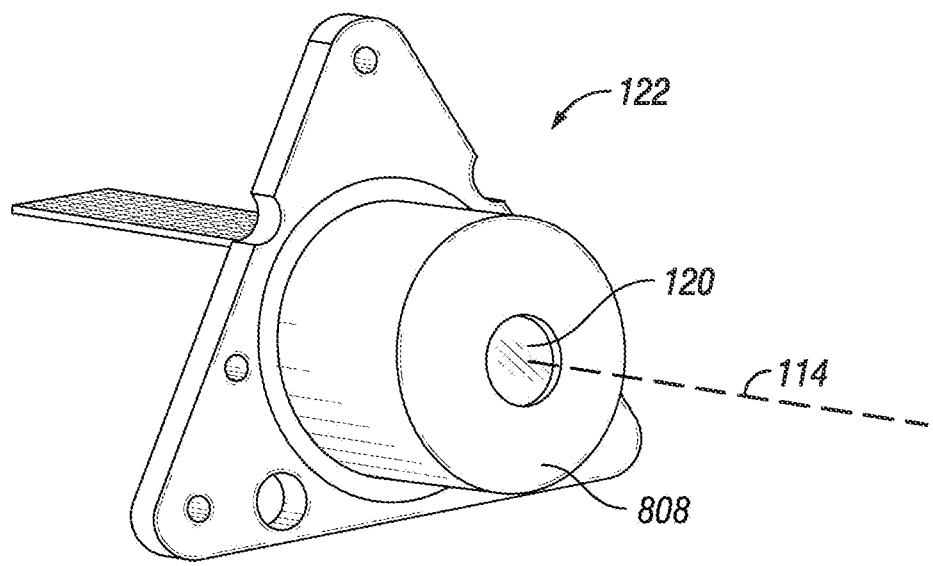
Figure 8C:
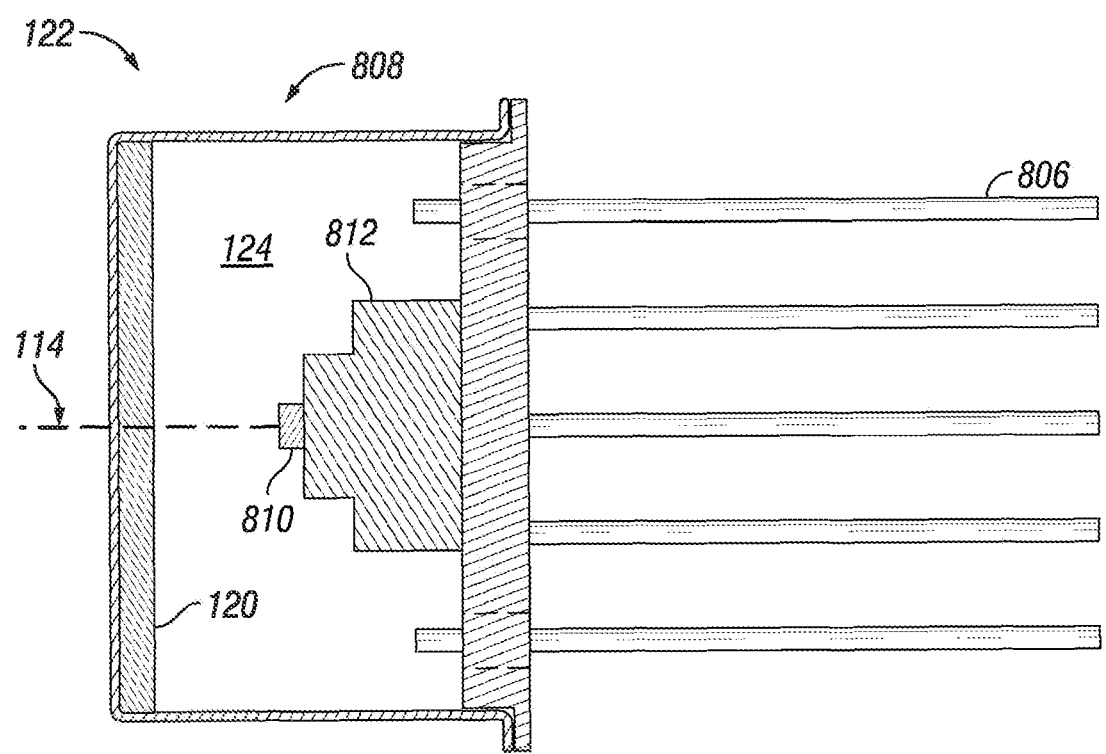

The detector of the spectroscopic device described herein responds to and generates voltage or current signals proportional to the amount of light reaching the detector. The absorption signals are calculated by normalizing by the incident light upon the detector without the absorption in the sample and reference cells, and the absorption signals are proportional to the amount of the interrogation light beam reaching it after passing through the sample cell and reference cell. The normalization can occur by identifying the amount of light in areas where there are no significant absorption features of interest for direct absorption spectroscopy (DAS) or by normalizing by the first harmonic of the wavelength modulation spectroscopy (WMS). FIGS. 8A-8C depict various exemplary features of a detector that may be used in the spectroscopic device described herein, such as detector 122. In particular, FIGS. 7A-7C show optical path 114 entering detector 122 from sample cell 104 through opening 804. While sample cell 104 is depicted, the sample cell in FIG. 8A can be any other suitable sample cell, including sample cell 204, 404. Opening 804 can comprise the second light transmission window as described above to allow entry of optical path 114 into detector 122 while maintaining seals in the detector module housing and/or the light-source-and-detector module housing, as well as sample cell 104. Additionally, or alternatively, referring to FIGS. 8A-8C, detector 122 can comprise detector cap 808, which can comprise the second light transmission window 120; hence, detector 122 can comprise second light transmission window 120. The descriptions with respect to the light transmission window, including window 120, provided herein are applicable whether it is separate from or part of detector 122 and will not be repeated. Additionally, or alternatively, referring to FIG. 8C, detector cap 808 can be hermetically sealed and back filled with a reference gas to a desired pressure, thereby allowing reference cell 124 to be part of detector 122 and eliminating the need for a separate reference cell, which reduces space, costs, alignment issues, and optical fringing. When the reference cell is a separate unit, such as that shown in FIGS. 1C and 2C, the interrogation light beam traverses two transmissive optics (i.e., the two windows on the reference cell), where transmissive optics result in back reflections along the optical path, or etalons or optical interference fringes. These fringes vary in phase, frequency, and amplitude depending upon the spacing between the various transmissive optics with one another and the light source. It can be challenging to differentiate the optical fringes from the absorption features of interest because they can be of similar width and magnitude as the absorption signals of interest of the sample and reference signals. When the reference cell is part of the detector, the beam traverses would not traverse these two transmissive optical elements, which can potentially improve performance because optical fringes form whenever light passes through transmissive optics. Descriptions with respect to the reference cell, including cell 124, provided herein are applicable whether it is separate from or part of detector 122 and will not be repeated.

As shown in FIG. 8C, detector 122 can comprise sensing component 810 that actually receives the interrogation light beam travelling along optical path 114 and generates an absorption signal accordingly. Optionally, detector 122 can further comprise thermoelectric cooler 812 that can be controlled to maintain the temperature of detector 122 in a certain desired range. Detector 122 can further comprise fibers 806 that transmit absorption signals generated by sensing component 810 to another component for further analysis or processing as described herein. Referring to FIG. 8A, detector 122 can further optionally comprise flange element 802 that can help protect fibers 806 and other interior components. Optionally, as shown in FIGS. 1C, 2C, 3C, the detector can be coupled to a preamplifier circuit 134, which is configured to amplify the detector output to enhance the signal-to-noise ratio. For instance, preamplifier circuit 134 can increase the signal from detector 122 by 1000 times.

Figure 9A:
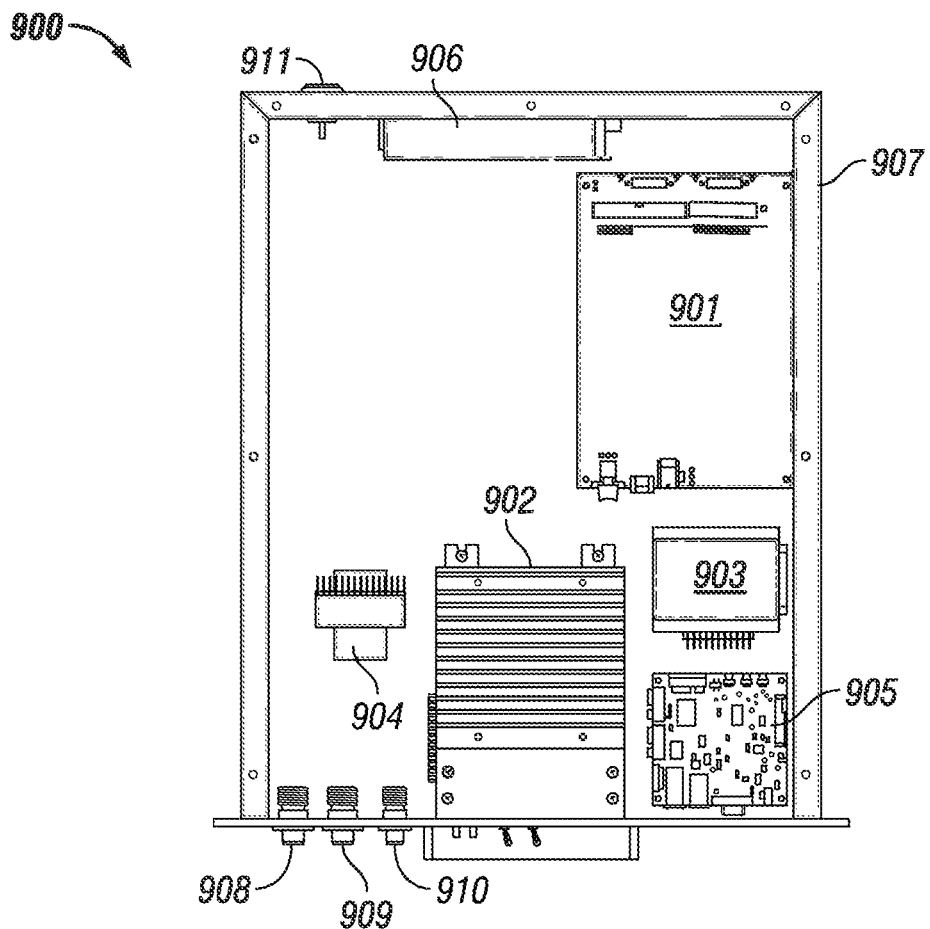
FIGS. 9A-9C depict various views of an exemplary electronic control unit (ECU) that may be used in the spectroscopic device as described herein.
Figure 9B:
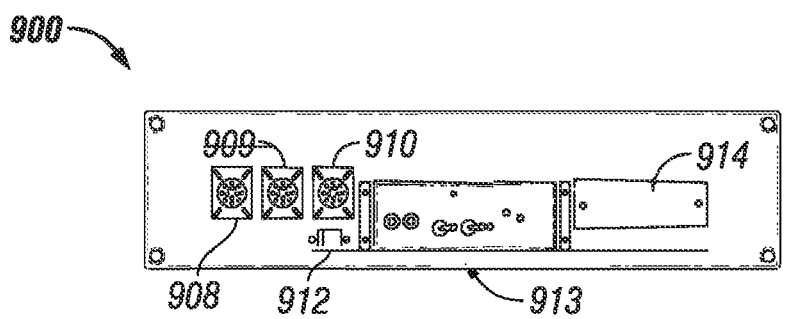
Figure 9C:
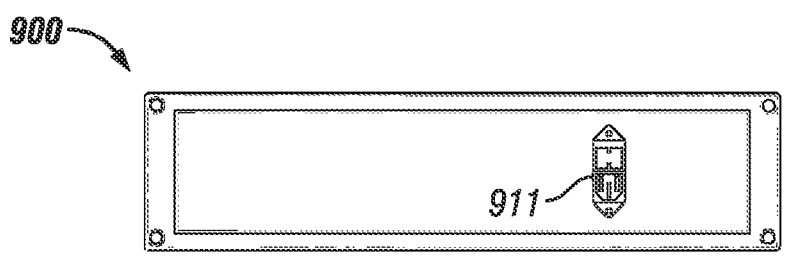

The spectroscopic device can further comprise an electrical control unit (ECU) to (i) provide power to the device, (ii) collect, analyze, and interpret the spectroscopic data, and/or (iii) control electronic components of the device. The ECU may be located separately from the sensing unit, where the ECU can be electronically connected to the sensing unit via electrical ports on the ECU and the sensing unit. For instance, the spectroscopic device of the present disclosure can further comprise electrical connectors, such as connectors 144 and 146 shown in FIGS. 1A, 2A, 3A, 4A, to connect the spectroscopic device with an ECU, such as ECU 900 shown in FIGS. 9A-9C, which can control the functions of and provide power to the spectroscopic device. FIGS. 9A-9C depict one option for the ECU of the present spectroscopic device. FIG. 9A is a top view of ECU 900 without a top to show ECU 900 can comprise data acquisition element 901, light source driver 902, light source temperature controller 903, detector temperature controller 904, processor/computer 905, which can be a single board computer or other computing elements with similar processing capabilities, AC to DC power supply 906, ECU housing 907, bulk head connectors 908, 909, and 910 of various sizes, and AC inlet power switch 911. FIG. 9B is a side view looking at the front panel of ECU 900, showing bulk head connectors 908, 909, and 910 of various sizes, switch 912, cutout 914 for access to the various ports of processor/computer 905, which can be used to connect various devices to ECU 900 (such as a sensing unit as described herein, mouse, keyboard, monitor, microphone, speakers, etc.) including various ports as needed or desired, including I/O (input/output) ports such as USB ports. FIG. 9C is a side view looking at the back panel of ECU 900, which shows AC inlet power switch 911. ECU 800 can be electrically connected to the spectroscopic device, such as unit 100, 200, 300, 400 via bulk head connectors 908, 909, and 910 and electrical connectors 144, 146, and/or 148. As one option for sensing unit 100 or 200 where electrical components are disposed on either side of the sample cell, the spectroscopic device has three electrical connectors, 144, 146, and 148, which can help to reduce noise in the signal, where bulk head connector 908 of ECU 900 can be electrically connected to electrical connector 144 and bulk head connectors 909 and 910 can be electrically connected to electrical connectors 146 and 148. Optionally for sensing unit 300, 400, where electrical components are located on one side of the sample cell, the spectroscopic device can have two electrical connectors, 144 and 146.

Figure 9D:
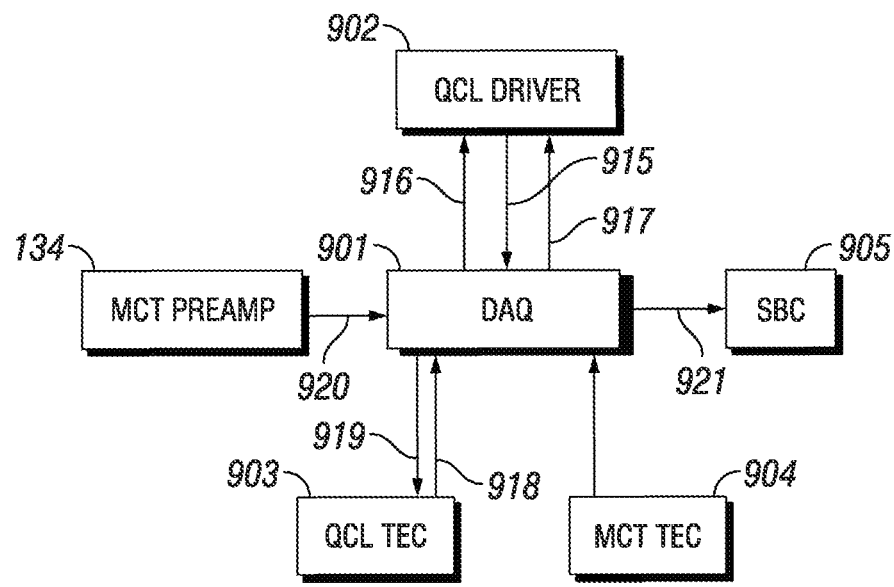
FIG. 9D depicts an exemplary information flow of certain components in the ECU.
Figure 9E:
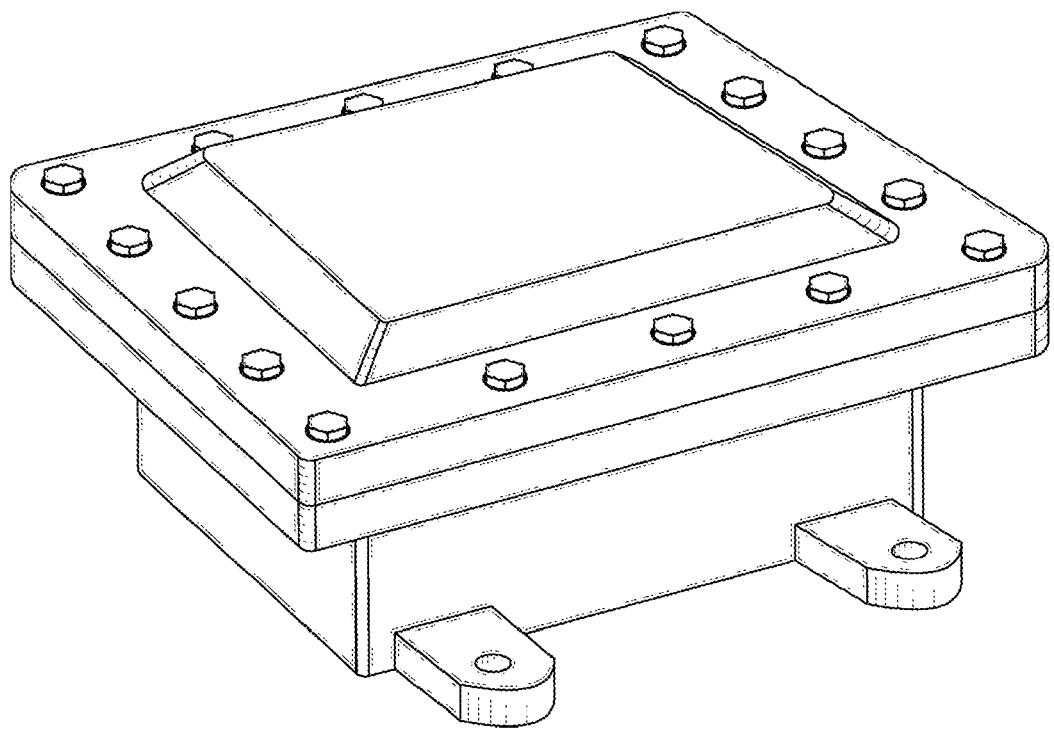
FIG. 9E depicts an exemplary ECU housing that may be used in the spectroscopic device as described herein.

FIG. 9D shows one option of how electronic components of ECU 900 communicate with one another. As shown, DAQ element 901 is hardware that acts as the interface between processor/computer 905 and various signals from at least the detector and the light source. DAQ element 901 can be configured to digitize incoming analog absorption signals so processor/computer 905 can interpret them. DAQ element 901 can be configured with functions for automating measurement elements and processes. DAQ element 901 can communicate with the light source with light source driver 902, which is a device driver or hardware driver known to one of ordinary skill in the art. Light source driver 902 sends operational data of the light source (such as current, etc.), shown as arrow 915, to data acquisition element 901, which in turn communicates certain control commands (shown as arrow 916) based on such information to light source driver 902 to execute. DAQ element 901 can also send on/off signals (shown as arrow 917) to activate/deactivate the light source as needed. Light source temperature controller 903 can send temperature data of the light source (arrow 918) to data acquisition element 901, which in turn can send commands to regulate the temperature of the light source as desired based on the information provided, shown as arrow 919. As shown in FIG. 3D the sensing device employs preamplifier 134, which amplifies the absorption signal from the detector. Preamplifier 134 communicates this absorption signal to data acquisition element 901, shown as arrow 919, for conversion into digital signals, which are sent to processor/computer 905 (arrow 921) for further analysis. DAQ element 901 can comprise a computer bus (not shown) to allow it to connect to processor/computer 905. The computer bus serves as the communication interface between DAQ element 901 and processor/computer 905 for passing instructions and measured data. Commonly known computer buses include wired communication, such as, USB, PCI, PCI Express, and Ethernet, or wireless communication, such as Wi-Fi and Bluetooth for wireless communication.

Processor/computer 905 can be configured to isolate, from the absorption signal 921, a reference absorption signal coming from the reference cell and a sample absorption signal coming from the sample cell and generate calibration information and concentration information of the one or two or more gas species of interest in the sample cell using the reference absorption signal and the sample absorption signal. The reference absorption signal can be a direct absorption spectroscopy (DAS) signal, and the sample absorption signal can be a wavelength modulated spectroscopy (WMS) signal. The wavelength modulated spectroscopy (WMS) signal can comprise a 2nd or higher harmonic of the sample absorption signal.

Processor/computer 905 can be installed with industrial control software that allows for autonomous operation of the spectroscopic device. Other industrial control configurations, such as any one of audio/visual alarm, alarm reset, alarm test, real time display of gas concentrations, and system diagnostics (such as, as applicable, light source power, detector calibration, battery level/power consumption, radio frequency (RF) signal, and/or other conditions that affect the performance of the device), can also be included. Optionally, if the spectroscopic device is used to monitor the purity of the hydrogen stored in or provided from a storage tank, including hydrogen dispensed at a hydrogen refueling station to a FCEV, the device control can be performed via an external panel integrated at the station where system diagnostics can be done locally at the station and/or centrally at a control station via automated email/text alerts with up to the minute data on abnormal gas levels, and/or a dedicated web page.

As described thus far and herein, the present disclosure provides a spectroscopic device that can be manufactured at a commercial scale, shipped to various locations for various gas sensing applications, and can be employed in various environments, including for use at a location where hydrogen is stored and/or disposed, such as a hydrogen refueling station to detect one or more unwanted trace gas species that can be detrimental to a fuel cell if present over a certain amount. The devices can be provided in a variety of selection to meet various needs, such as sizes, applications, features, including being configured to probe for one or more particular gas species of interest where the device may have a particular light source configured for that gas species, a reference cell pre-filled with a reference gas species that is the same as the gas species of interest, and/or a sample cell configured with the suitable path length for the gas species of interest and/or other specifications suitable for the sensing environment (such as temperature and pressure tolerances).

With respect to hydrogen dispensing applications, there are standards, such as those set by the International Organization for Standardization (ISO), regulating the maximum amount of certain gas species which can be present in the hydrogen gas that is dispensed at a hydrogen refueling station, particularly to a FCEV. ISO standard 14687-2:2012, for example, sets permitted levels of contaminants for hydrogen supplied to vehicles equipped with polymer electrolyte membrane (PEM) fuel cells. Use of the spectroscopic device as described herein can ensure compliance with such standards. For instance, a hydrogen refueling station can employ one spectroscopic device as described herein to probe for all gas species of interest, such as those regulated by the ISO. Alternatively, or additionally, a hydrogen refueling station can use multiple spectroscopic devices as described herein, where each is configured to probe for a subset of the gas species of interest. Alternatively, or additionally, a hydrogen refueling station can use multiple spectroscopic devices as described herein, where each is configured to probe for one gas species of interest. As noted above, spectroscopic devices comprising a single-pass or dual-pass sample cell, such as unit 100 or 400, are particularly suitable for sensing one gas species of interest while devices comprising a multi-pass sample cell, such as unit 200, 300, are particularly suitable for sensing multiple gas species of interest but they are suitable for sensing one species of interest as well.

Figure 10:
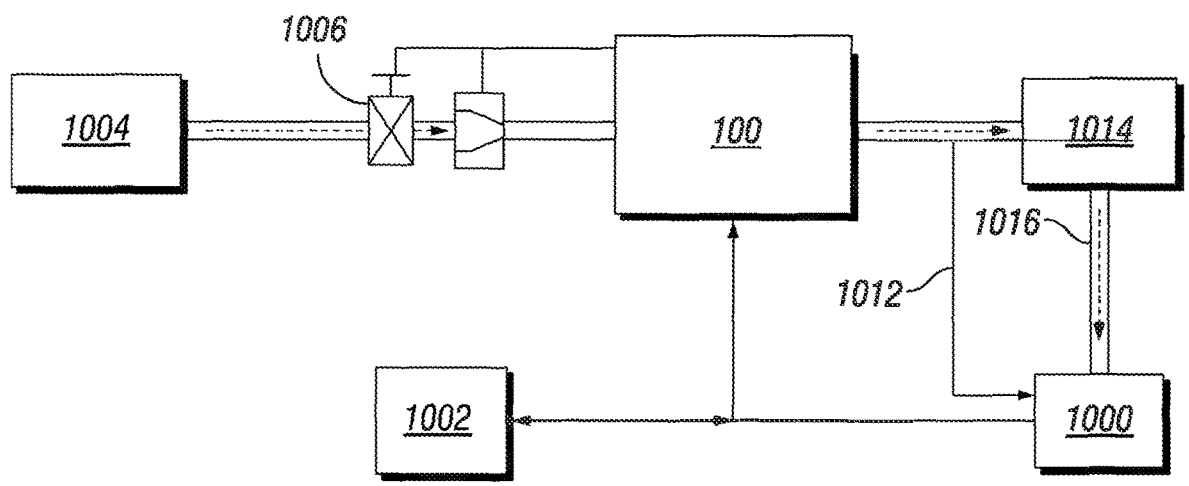
FIG. 10 depicts an exemplary system employing the spectroscopic device as described herein.

FIG. 10 depicts one option to employ the spectroscopic device as described herein, such as a device described herein comprising sensing unit 100 (as depicted in FIG. 9), 200, 300, and/or 400, in connection with a hydrogen refueling station to monitor the purity of the hydrogen being dispensed. While unit 100 is referred to for convenience, it is understood that other units described, including unit 200, 300, or 400 may be suitably employed in FIG. 10, and the descriptions relating to unit 100 also apply to other units, such as unit 200, 300, or 400 where applicable. As shown, system 1000 comprises backup battery 1002 electrically coupled to sensing unit 100, hydrogen storage tank 1004 fluidly coupled to sensing unit 100, solenoid valve 1006 and pressure/flow controller 1008 disposed between hydrogen storage tank 1004 and sensing unit 100. As shown, backup battery 1002 is configured to provide power to initialize the spectroscopic device as described herein, such as unit 100 (as depicted in FIG. 10), 200, 300, or 400. After sensing unit 100 is turned on, fuel cell 1010 can power sensing unit 100 and charge backup battery 1002. Once activated, sensing unit 100 can turn on solenoid valve 1006 and control the gas flow from storage tank 1004 to sensing unit 100 with pressure/flow controller 1008. The hydrogen gas preferably enters the sample cell of sensing unit 100 via sample gas input port 130 and exits the sample cell via sample gas output port 132. In operation, the light source of unit 100 sends an interrogation light beam through the sample cell and the reference cell into the detector. The processor/computer in the ECU analyzes the absorption signal to determine whether the hydrogen gas contains one or more gas species of interest in an amount that exceeds the concentration limit. If it is determined that the hydrogen gas does not contain one or more gas species of interest in an amount that exceeds the concentration limit, it can proceed to fuel cell 1010 via line 1012. If it is determined that the hydrogen gas does contain one or more gas species of interest in an amount that exceeds the concentration limit, it can proceed to impurity scrubber 1014 before entering fuel cell 1010 via line 1016.

Figure 11:
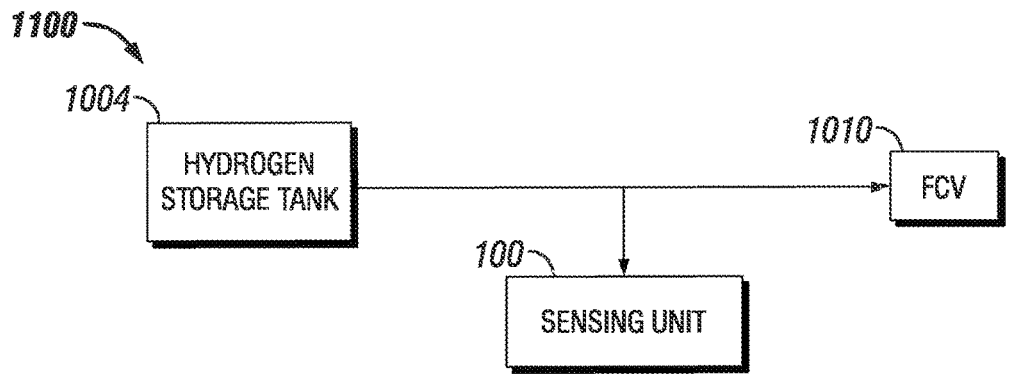
FIG. 11 depicts one exemplary arrangement of the spectroscopic unit or spectroscopic device as described herein in relation with a hydrogen storage tank and a FCV as described herein.

Additionally, or alternatively, FIG. 11 depicts one option to employ the spectroscopic device as described herein in a hydrogen dispensing station to monitor the purity of the hydrogen being dispensed. In particular, a slip stream from the hydrogen feed from hydrogen storage tank 1004 to FCV 1010 may be diverted to a spectroscopic device described herein, such as unit 100 as shown in FIG. 11, or unit 200, 300, or 400, for detection of whether a certain species of interest is above a predetermined concentration instead of the hydrogen feed flowing through spectroscopic device 100 prior to reaching FCV 1010 as shown in FIG. 10.

The following paragraphs provide additional details regarding the processes of calibrating a spectroscopic device and measuring the concentration of a gas sample after such calibration. The process described herein allows for use of a reference gas species that is the same as a gas species of interest in the gas sample, as well as the use of the combination of direct absorption spectroscopy and wavelength modulation spectroscopy in analyzing the absorption signals. FIG. 12A depicts process flow 1200 when the spectroscopic device described herein is activated (powered on), where optional mirrors and lenses that can be used to direct and/or enhance the interrogation light beam known to one of ordinary skill in the art are omitted for the sake of simplicity. In operation, light source 112 sends an interrogation light beam along optical path 114 toward sample cell 104. It is understood that the sample cell in the process flow can be other types of sample cell as described herein, such as single-pass, dual-pass, or multi-pass, including sample cells 204 or 404. Sample cell 104 contains a gas sample that may or may not have the gas species of interest being probed, preferably at least one of hydrogen sulfide ($H_2S$), carbon monoxide (CO), methane ($CH_4$), water vapor ($H_2O$), and ammonia ($NH_3$). Sample cell 104 may be a discrete sample where gas flows into an evacuated cell up to a certain pressure (0.01-1 atmospheres) and then a valve closes, and the sample is probed by the system. Alternatively, sample cell 104 may be a continuous flow where the gas sample is continuously flowing through sample cell 104, preferably via sample gas input port 130 and sample gas output port 132, as shown in at least FIGS. 1A, 2A, 3A, and 4A.

The sample gas input port can be optionally configured to accommodate the change in pressure between the source of the sample gas and the operating pressure of the sample cell, such as from a pressure in a range of 700 barg to 1000 barg to an operating pressure in a range of up to 30% below ambient pressure (about 1 bar) to up to 30% above ambient pressure, such as at least 3 barg. The sample gas input port and the sample gas output port can be positioned at an angle in a range from 0 degree and about 180 degrees from each other. Sample gas input port 130 and sample gas output port 132 are preferably arranged relative to one another to achieve a desirable flowrate, such as an optimal flowrate for the size of the particular sample cell, which may be determined through routine means by one of ordinary skill. For instance, optionally, sample gas input port 130 and sample gas output port 132 can be positioned about 180 degrees from each other or they may be positioned about 0 degree from each other as shown in FIG. 5, or any angle in between. After passing through sample cell 104, the interrogation light beam continues on optical path 114 through reference cell 120 to enter detector 122. Reference cell 120 can be a separate reference cell as shown in FIGS. 1C and 2C or it can be part of detector 122, as shown in FIGS. 3B and 8A-8C. Reference cell 120 contains a reference gas species that is the same as one of the gas species of interest to be probed in the gas sample provided to sample cell 104, preferably where the species of interest optionally includes at least carbon monoxide or methane. The pressure of reference cell 120 is below atmospheric pressure. The reference cell can have a pressure that is below atmospheric pressure, which optionally can be in a range of 0.01 Torr to 100 Torr, or about 1.3 Pascal to about 13 Kilopascal. The pressure, or the partial pressure, of a gas species of interest in a reference gas can be in a range from about 0.01 atmospheres to about 0.5 atmospheres (or from about 1.01 kPascal to 50.66 kPascal), from about 0.03 atmospheres to about 0.3 atmospheres (or from about 3.04 kPascal to about 30.4 kPascal), or from about 0.05 atmospheres to 0.15 atmospheres (or from about 5.07 kPascal to about 15.2 kPascal) or may be about 0.1 atmospheres (or about 10.13 kPascal) or less. While FIG. 12 depicts sample cell 104 positioned in optical path 114 before reference cell 120, it is understood this order can be swapped where reference cell 120 is positioned in optical path 114 before sample cell 104.

Figure 13:
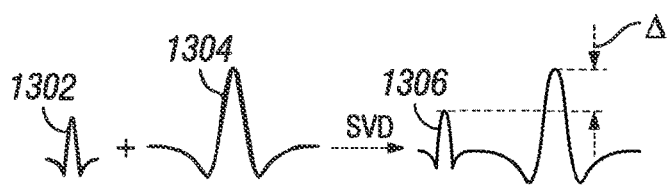
FIG. 13 depicts an exemplary representative spectroscopic signal generated and/or received by the spectroscopic device as described herein.

Detector 122 generates an absorption signal proportional to the amount of the interrogation light beam reaching it after passing through sample cell 104 and reference cell 120, which is a direct absorption spectroscopy (DAS) signal. Detector 122 sends this DAS signal to ECU 900, depicted as arrow 920, for processing (such as via the DAQ element and processor/computer 905 as described above) and generating corresponding data output. The DAS signal 920 sent to ECU 900 contains (i) DAS signal from reference cell 120, which may be referred to as a reference DAS signal, and (ii) a DAS signal from sample cell 104, which may be referred to as sample DAS signal. The processor/computer in ECU 900 can be configured to isolate the reference DAS signal and the sample DAS signal from absorption signal 920 and generate calibration and concentration information, as applicable, based on DAS signal 920. The reference DAS signal may be isolated from the sample DAS signal due in part to the pressure of reference cell 120 being lower than atmospheric pressure, which produces a reference DAS signal comprising an absorption feature that is narrower than the absorption feature in a signal coming from a cell at ambient or higher than ambient condition, such as that in sample cell 104. FIG. 13 illustrates one option to generate calibration information based on direct absorption spectra (DAS). Narrower reference DAS signal 1302 can be combined with broader sample DAS signal 1304 to generate calibrated DAS signal 1306 where the spectral portion defined by narrower reference DAS signal 1302 is subtracted from broader sample DAS signal 1304, denoted by the delta symbol and the reference signal relates to a known absorption signal which can then serve as a reference to the sample absorption signal, and hence, concentration.

Optionally, multiharmonic wavelength modulation spectroscopy (WMS) can be used to generate calibration data. WMS can be thought of as a derivative of the absorption spectrum, which results in a derivative-like shape of direct absorption spectra where the second derivative of the absorption profile would be the second harmonic signal (spectrum). The processor/computer of the ECU can be configured to fit a higher harmonic signal (higher-derivative like) to the reference WMS signal, thereby generating a reference WMS signal. The second harmonic WMS absorption signal from detector 122 is the superposition of the 2nd-derivative like shape of the combined reference and sample absorption spectrum. In contrast, when examining the higher harmonics (derivatives) such as the 4th, 6th, or 8th harmonics, the broad and slowly changing sample signal results in a flat baseline while the narrow and sharp reference signal dominates. By relating the higher harmonic signal that is derived from the reference signal with the lower harmonic sample-dominated signal through spectroscopic principles of the Beer-Lambert law and wavelength modulation spectroscopy, the sample signal can be calibrated.

Figure 12:
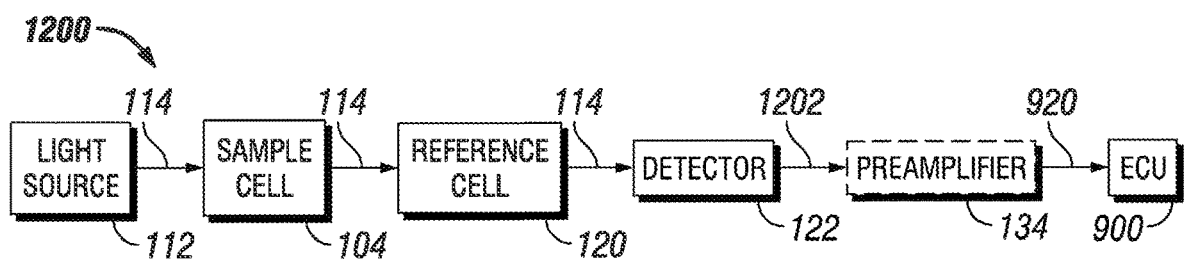
FIG. 12 depicts one exemplary block diagram of various components in the spectroscopic device as described herein.

Referring to FIG. 12, preamplifier circuit 134 is optional and is preferably employed in conjunction with multiharmonic wavelength modulation spectroscopy (WMS). In general, WMS superimposes a high frequency (e.g., 10-100 kHz) sinusoidal oscillation on a lower frequency (e.g., approximately 0.1-1 kHz) light source current ramp across an absorption feature. The high-frequency modulation induces an amplitude modulation in the direct absorption spectroscopy (DAS) signal generated by detector 122. Preamplifier circuit 134 multiplies the DAS signal from detector 122 with the sinusoidal signal from the reference DAS signal at different harmonics of the modulation frequency, Nf. By shifting the detection bandwidth into higher frequencies, 1/f laser excess noise is diminished, and generally higher sensitivities (about 10-100 times) are achieved over direct absorption spectroscopy. Also, because the Nf spectrum is qualitatively similar to the Nth derivative of the absorption signal, it is nominally a "zero-baseline" technique in that gradually sloping tails of nearby absorbers are eliminated.

Another option to generate calibration data using WMS can include configuring the processor/computer of the ECU to fit a both the reference DAS signal and the sample DAS signal using known lineshape equations consistent with the Beer-Lambert absorption line. The sample spectrum would be fit to all areas except where the narrow reference signal existed. Voigt, Lorentzian, and Gaussian lineshape equations to each signal can be used depending upon the total pressures of the sample and reference cells. Gaussian lineshapes are used primarily for very low pressures (<10 Torr) while Voigt lineshapes are used for higher pressures (combination of Gaussian and Lorentzian lineshapes).

Because signal amplitude can be proportionally correlated to the concentration the gas species of interest that is probed, spectrally isolating the lineshapes of the sample and reference cells yields the ability to relate the known reference cell absorption with the sample cell. This can be done either using direct absorption spectroscopy (DAS) or multiharmonic wavelength modulation spectroscopy (WMS) as described above. WMS is more sensitive and requires smaller spectral ranges in its tuning. DAS is less sensitive and requires broader spectral tuning but is easier to implement as no additional, fast modulation of the laser (>10 kHz) is required while scanning absorption features.

Accordingly, a spectroscopic method for detecting one or more gas species of interest in a gas sample is also provided herein. The method comprises transmitting an interrogation light beam from a coherent light source through a sample cell containing one or more gas species of interest to be detected. The interrogation light beam also passes through a reference gas at a pressure below atmospheric, where the reference gas comprises at least one of the one or more gas species of interest to be detected in the sample cell. In certain embodiments, the reference gas comprises a single species of interest. In certain embodiments, the reference gas is present in an in-line reference cell. The method also includes detecting the intensity of the light beam after passing through the reference gas and the sample cell, then generating both a direct absorption spectroscopy (DAS) signal and a wavelength modulated spectroscopy (WMS) signal based on the detected light intensity. Calibration information may be generated by setting the direct absorption spectroscopy (DAS) signal as a constant reference signal for the wavelength modulated spectroscopy (WMS) signal. The spectroscopy method may also include determining the concentration of the one or two or more gas species of interest in the sample cell based on the wavelength modulated spectroscopy (WMS) signal. In certain embodiments, the wavelength modulated spectroscopy (WMS) signal comprises a $2^{nd}$ or higher harmonic of the intensity of the detected light intensity.

The spectroscopic device of the present disclosure can measure the concentration of one or two or more gas species of interest in a gas sample, where the spectroscopic device may comprise one light source 112 as shown in various figures. When two or more gas species of interest are being sensed and the spectroscopic device has one light source, that light source can be configured to sequentially probe for spectral features at individual wavelengths associated with the molecular absorption cross-section of a particular gas species of interest. Preferably, the gas species of interest exhibit absorption spectral features at wavelengths that are close to each other, such as within 5-20 nm. For instance, in a gas sample being sensed or probed for methane and water vapor, where the water vapor exhibits absorption spectral features at a higher wavelength than that of methane, the light source may be configured to probe for the spectral features of water first then methane, or vice versa.

Figure 14:
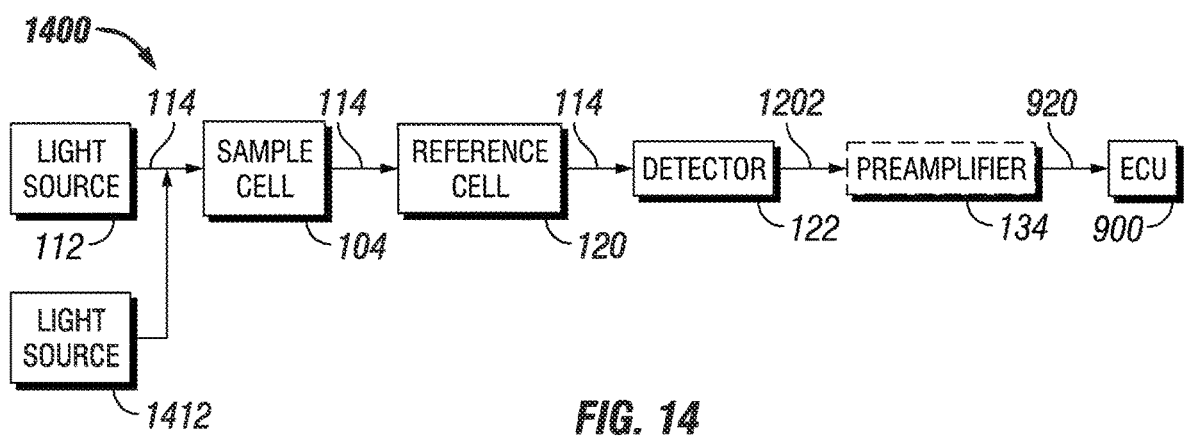
FIG. 14 depicts one exemplary block diagram of various components in the spectroscopic device as described herein

Alternatively, referring to FIG. 14, the spectroscopic device as described herein can further comprise second light source 1412, which is similar to light source 112 as described herein except, first light source 112 is configured to probe for spectral features at one wavelength associated with the molecular absorption cross-section of a first gas species of interest and second light source 1412 is configured to probe for spectral features at another wavelength associated with the molecular absorption cross-section of a second gas species of interest. Light source 112 and light source 1412 takes turn to sequentially transmit its respective interrogation beam that follows optical path 114 and gets processed as described herein. If a second light source is present, it is understood that the ECU of such spectroscopic device can also include a second temperature controller and other connections to allow for the operation and control of the second light source as applicable.

Figure 15:
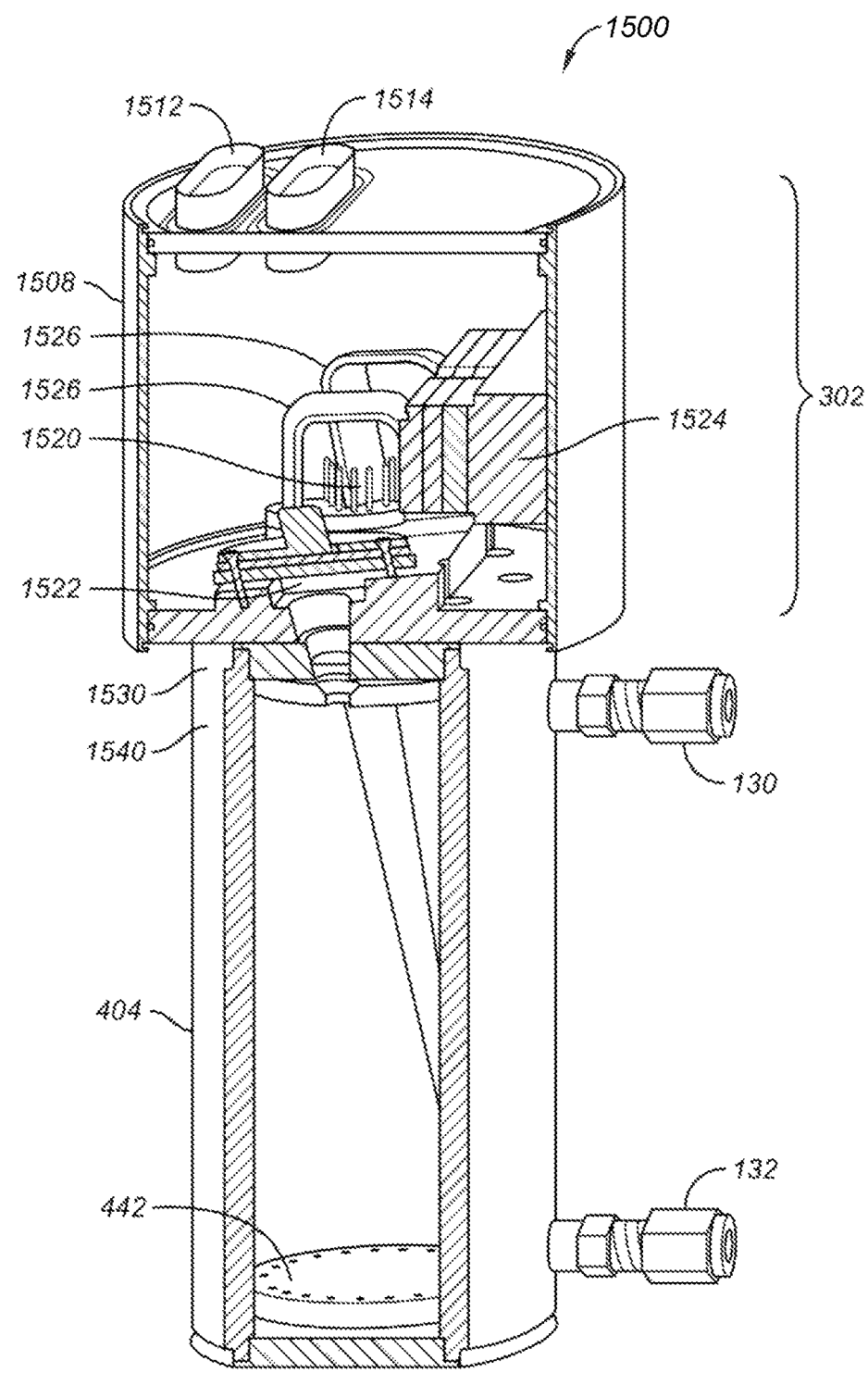
FIG. 15 depicts the system with ATR for liquid or solid sample measurement.

If ammonia ($NH_3$) is being detected, the wavelength at which an absorption feature is probed can be 8211 nm and the duration of time can be at least 50 seconds. If water vapor ($H_2O$) is being detected, the wavelength at which an absorption feature is probed can be 8207 nm and the duration of time can be in a range of 1-10 seconds. If methane ($CH_4$) is being detected, the wavelength at which an absorption feature is probed can be 8206 nm and the duration of time can be in a range of 1-10 seconds. If hydrogen sulfide ($H_2S$) is being detected, the wavelength at which an absorption feature is probed can be 8202 nm and the duration of time can be at least 50 seconds FIG. 15 shows a view of an embodiment of a spectroscopic device as described herein. Sensing unit 1500, is shown with a cutout to show the internal arrangement of various components. Certain components in other figures, including FIGS. 3A-3C and 4A-4C, can be the same as those in FIG. 15, so they have the same numeral reference and the descriptions associated therewith, including from other applicable figures, and thus such descriptions need not be repeated. As can be seen in FIG. 15, mirror 442 can be coupled to sample cell in a manner that does not involve use of a flange module, such as flange module 306. All descriptions for light-source-and-detector module housing 308 are applicable to light-source-and-detector module housing 1508. In addition, housing 1508 further comprises, e.g., hermetically sealed connectors 1512 and 1514 to enable sensing unit 1500 to connect to ECU 900. Sensing unit 1500 further comprises laser 1520 independently stabilized with its own thermoelectric cooling; detector 1522 independently stabilized with its own thermoelectric cooling; secondary thermoelectric cooling 1524; heat straps 1526 connected to secondary thermoelectric cooling 1524 that are configured to help remove heat from the laser 1520 and detector 1522; detector cap 1530 containing one or more reference gasses; and a sapphire window 1540 welded in. The sensing unit 1500 is optionally backfilled with Argon. Optionally, all the parts (including secondary thermoelectric cooling 1524; heat straps 1526; detector cap 1530; and sapphire window 1540) are baked out and assembled under inert atmosphere. In any of the embodiments, less than 0.1 ppm moisture, and preferably less than 0.01 ppm moisture, can optionally exist in the system. Embodiments of the sensing unit described herein are optionally configured to work in temperatures ranging from −40° C. to 50° C. In certain embodiments, the spectrometer plugs into the electronics housing via a hermetically/waterproof seal. In certain embodiments, the sensing unit utilizes less or equal to 15 W, preferably less than or equal to 12 W, and more preferably less than or equal to 10 W of power without the secondary thermoelectric coolers 1524, and less than or equal to 60 W, and preferably less than or equal to in extreme conditions when all four coolers are working.

Figure 16A:
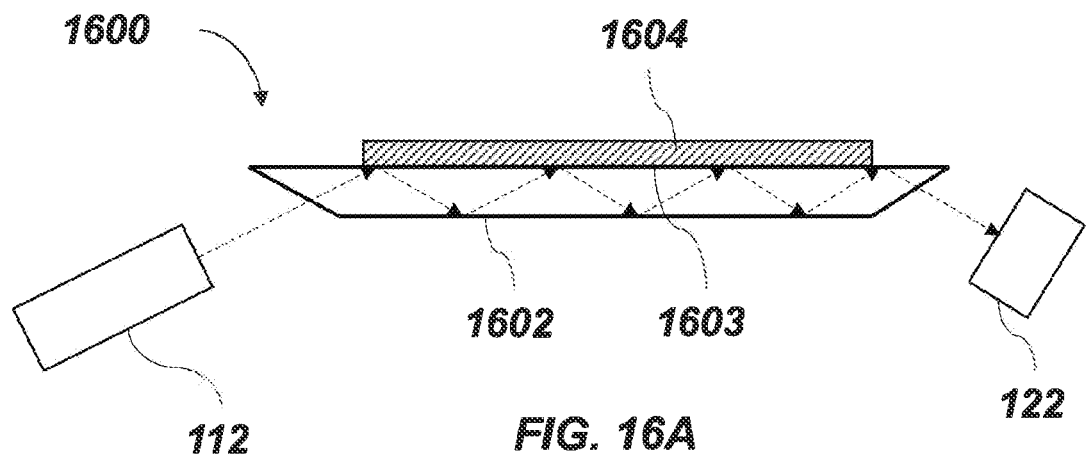
FIG. 16A-16C depict exemplary arrangements of a various components in the spectroscopic device as described herein.
Figure 16B:
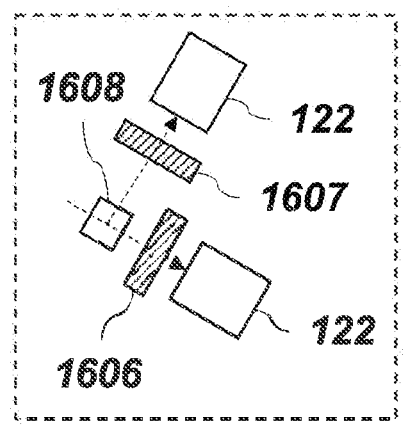
Figure 16C:
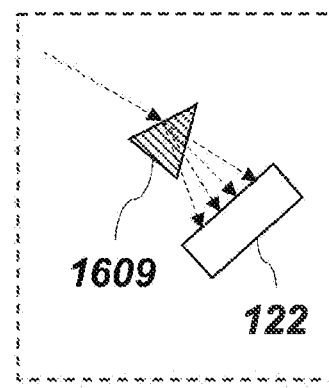

Referring now to FIGS. 16A-16C, another embodiment of the sensing unit is provided in which the multi-pass sample cell (such as sample cell 204 described elsewhere) or other sample cells (such as sample cells 104 and 404) is replaced with an attenuated total reflection cell (ATR). In FIG. 16A, sensing unit 1600 includes a light source 112. Although sensing unit 1600 may not be depicted in similar manners as sensing units 100, 200, 300, 400, and 1500, certain components in other figures, including FIGS. 3A-3C, 4A-4C, and 15, can be the same as those in FIGS. 16A-16C, so they have the same numeral reference and the descriptions associated therewith, including from other applicable figures, and thus such descriptions need not be repeated. Similarly, other relevant descriptions regarding the operation of other sensing units as understood by one of ordinary skill are equally applicable to sensing unit 1600, such as operation and arrangement of the components, and need not be repeated. For instance, light source 112 and detector 122 may be arranged on either side of ATR cell 1602 as depicted and similar to the arrangement shown in at least FIGS. 1A-2C. Optionally, while not depicted, it is understood that light source 112 and detector 122 may also be arranged to be on the same side of ATR cell 1602 with the use of mirrors as described and depicted in at least FIGS. 3A-4C. Light source 112 may include, but is not limited to, a tunable laser (e.g., a Quantum Cascade Laser (QCL) or Interband Cascade Laser (ICL), etc.) or a broadband light source (e.g., an LED, a blackbody, etc.).

A liquid or solid sample 1604 is placed upon an ATR cell 1602. The ATR cell composition may include, but is not limited to, diamond, ZnSe, ZnS, silicon, germanium or KRS-5 crystal.

After the sample is placed, the light source 112 may then direct light into the attenuated total reflection (ATR) cell 1602 in such a way that it reflects at least once off the internal surface 1603 in contact with the sample 1604. The number of reflections may be varied by varying the angle of incidence. The beam is then collected by a detector 122 after exiting the ATR cell.

As seen in FIGS. 16A-16C, the post-ATR detection portion of the system can include various options. For example, the embodiment shown in FIG. 16A illustrates where the light simply passes from the ATR cell directly into a detector 122 (e.g., an IR detector). Another embodiment, shown in FIG. 16B, illustrates where the light passes from the ATR cell, through a filter 1606 (e.g., a filter wheel or a mems filter), and then into a detector 122. FIG. 16B also illustrates another embodiment, where the light passes from the ATR cell to a beam splitter 1608, where a portion of the light passes through the beam splitter 1608, through the first filter 1606, and into a detector, while another portion is reflected and passed through a different filter 1607 and into an additional detector. Another embodiment, shown in FIG. 16C, illustrates where the light passes from the ATR cell, through a diffraction optic 1609 to, e.g., a detector 122 such as a linear IR detector array.

Using a tunable laser as laser source 112, the system 1600 is capable of performing both direct absorption spectroscopy (DAS) and a wavelength modulated spectroscopy (WMS).

Figure 19A:
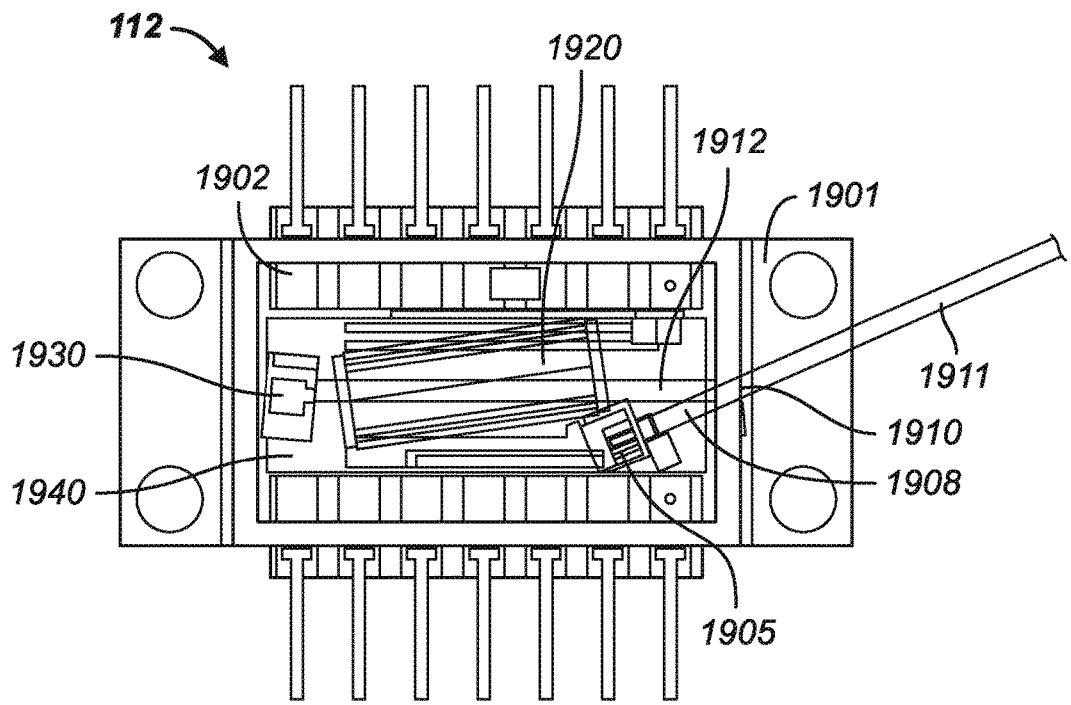
FIGS. 19A-19C depict one embodiment of a laser source containing an additional gas reference cell.
Figure 19B:
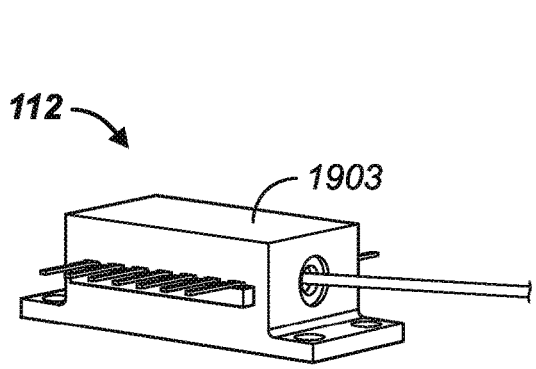
Figure 19C:
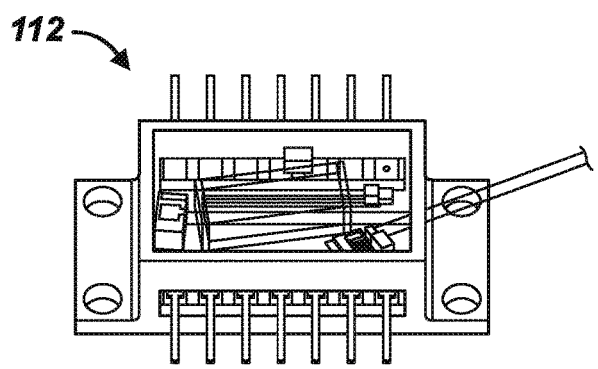

Referring now to FIGS. 19A-19C, in certain embodiments, laser source 112 has a body 1901 defining a laser cavity 1902. In certain embodiments, an additional reference cell 1920 may be incorporated into the laser cavity 1902. Laser 1905 outputs a laser 1908, which passes through an angled beam tap 1910. A portion 1911 of laser output 1908 is provided as previously described. However, a portion 1912 is reflected back through the gas reference cell 1920 and on to detector 1930. The laser source may also contain an optical micro bench 1940, which may include, e.g., electrical routing and a thermo-electric cooler.

These embodiments provide an alternate approach for calibrating the whole system—information regarding laser and detector performance can be verified by the reference gas in the laser source and the reference gas in the detector head. The extra detector 1930 and reference gas 1920 in the laser source is not in the path of the gas of interest and may be used to help quantify detected values since the concentration is known, and allows verification as to whether any signal change is due to system failure or a presence of the gas of interest in detector head. As shown in FIGS. 19B, the laser source 112 may optionally be provided as a hermetically sealed butterfly package 1903.

To facilitate a better understanding of the device, system, and method described herein, the following examples are given. In no way should the following examples be read to limit, or to define, the scope of the device, system, and method described herein.

EXAMPLES

Figure 17:
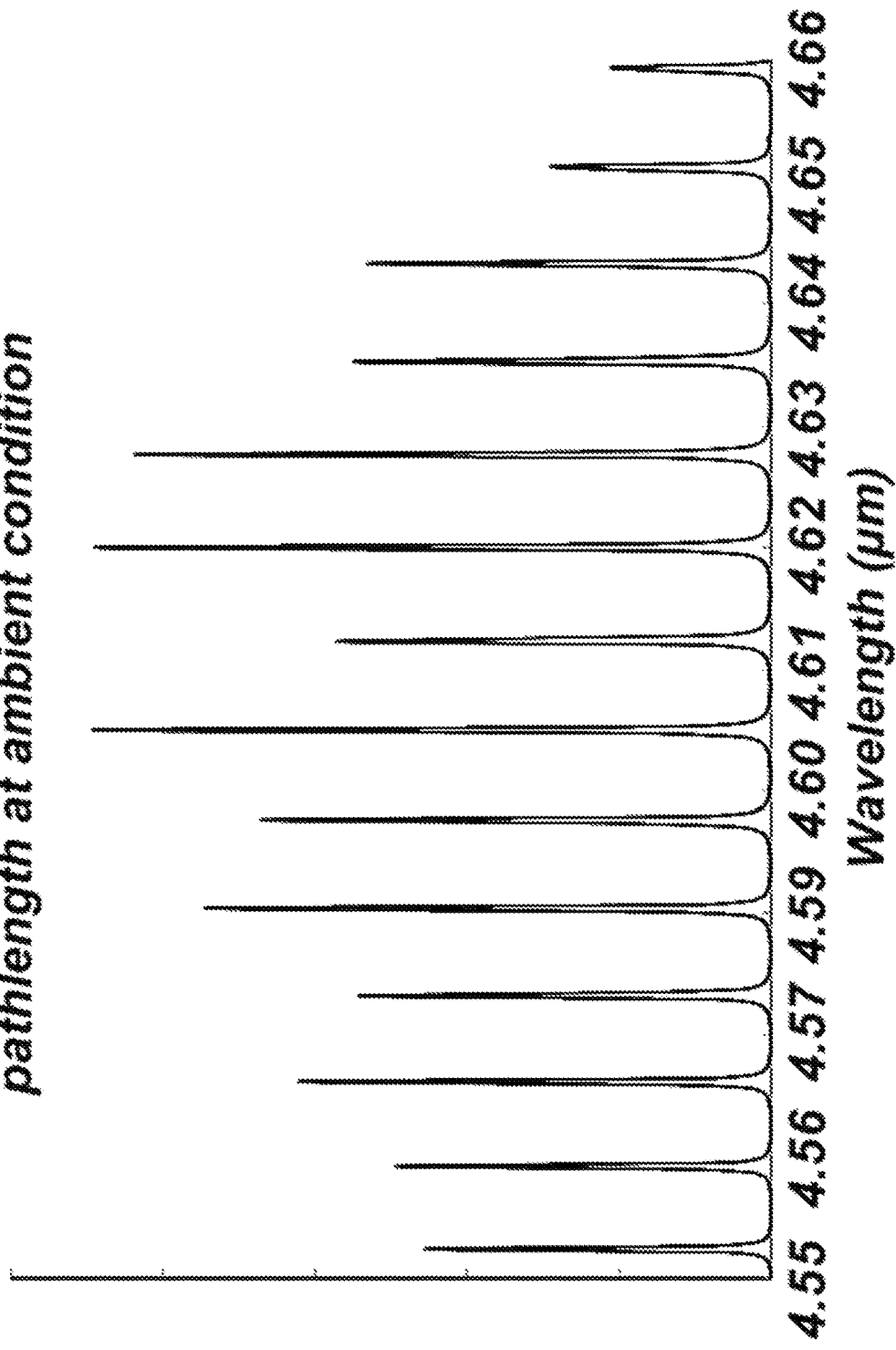
FIG. 17 is a graph of at least a portion of the spectroscopic detection region with calculated spectra from the HITRAN spectral database for a 20 cm optical path length at ambient conditions (298 K, 1 atm) for 0.2 parts per million volume (ppmv) of carbon monoxide in nitrogen.

Example 1: Detection of Carbon Monoxide (CO) as the Gas Species of Interest in a Hydrogen Gas Sample Using Carbon Monoxide as the Reference Gas Species Example 1 provides an illustrative spectroscopic device and method to detect carbon monoxide ambient conditions using a quantum cascade laser (QCL) as a coherent light source, such as light source 112 in the figures and a HgCdTe (mercury cadmium telluride or MCT) detector, such as detector 122 in the figures. Using information from the HITRAN spectral database, it was determined that carbon monoxide can be detected theoretically under ambient pressures and temperature using a sample cell that has a relatively short path length of about 20 cm in the spectral region of around 4600 nm. In particular, FIG. 17 shows at least a portion of the spectroscopic detection region with calculated spectra from the HITRAN spectral database for a 20 cm optical path length at ambient conditions (298 K, 1 atm) for 0.2 parts per million volume (ppmv) of carbon monoxide in nitrogen. This information was used to select the light source of the spectroscopic device of Example 1 as a QCL 4680, HHL Package, fiber coupled (operating at +30 degrees C.) also manufactured by SRI, 201 Washington Road, Princeton, NJ 08540. This QCL light source is designed to transmit an interrogation light beam configured to probe a spectral region of near 4600-4700 nm. This HITRAN information is also used to select the detector of the spectroscopic device of Example 1 as a HgCdTe (MCT) detector. HgCdTe (MCT) photodetectors are known to one of ordinary skill in the art and can be available commercially from manufacturers, such as Thor Labs. The HgCdTe (MCT) photodetector of Example 1 was made by SRI, 201 Washington Road, Princeton, NJ 08540. The HgCdTe (MCT) photodetector used in Example 1 can probe in the mid-IR (infrared) wavelength range of 3 microns to 30 microns. The HgCdTe (MCT) photodetector can comprise a thermoelectric cooler that can be controlled to maintain the temperature of detector, particularly the sensing component, in a certain desired range.

The laser was a QCL 4680, HHL Package, fiber coupled (operating at +30 degrees C.) (SRI, 201 Washington Road, Princeton, NJ 08540) fitted into a custom made single-pass optical cell. The laser collimated laser light propagates in the single-pass optical cell to create a 0.5 meter path length. After the light passes through the single-pass optical cell, it enters the detector cap. The detector (BV6.4, Intelligent Material Solutions, Inc.) is hermetically sealed on the other side of the ZnSE AR coated window. The detector in this example is 250 microns×250 microns. It is situated on a Thermoelectric cooler (Melcor Coolers) operating at −50 degrees C. The cooler is mounted on a TO-8 header (Sinclair Manufacturing). The cap of the detector is hermetically sealed and is backfilled under lower pressure (13 hPa) with $N_2$ and CO (0.5% in $N_2$) as the reference gas to provide real-time calibration.

Prophetic Example 2: This prophetic example is a hypothetical detection of two or more of any combination of the following gas species: $H_2S$, $CH_4$, $H_2O$, and $NH_3$ in a hydrogen gas sample where the reference species is methane.

Figure 18A:
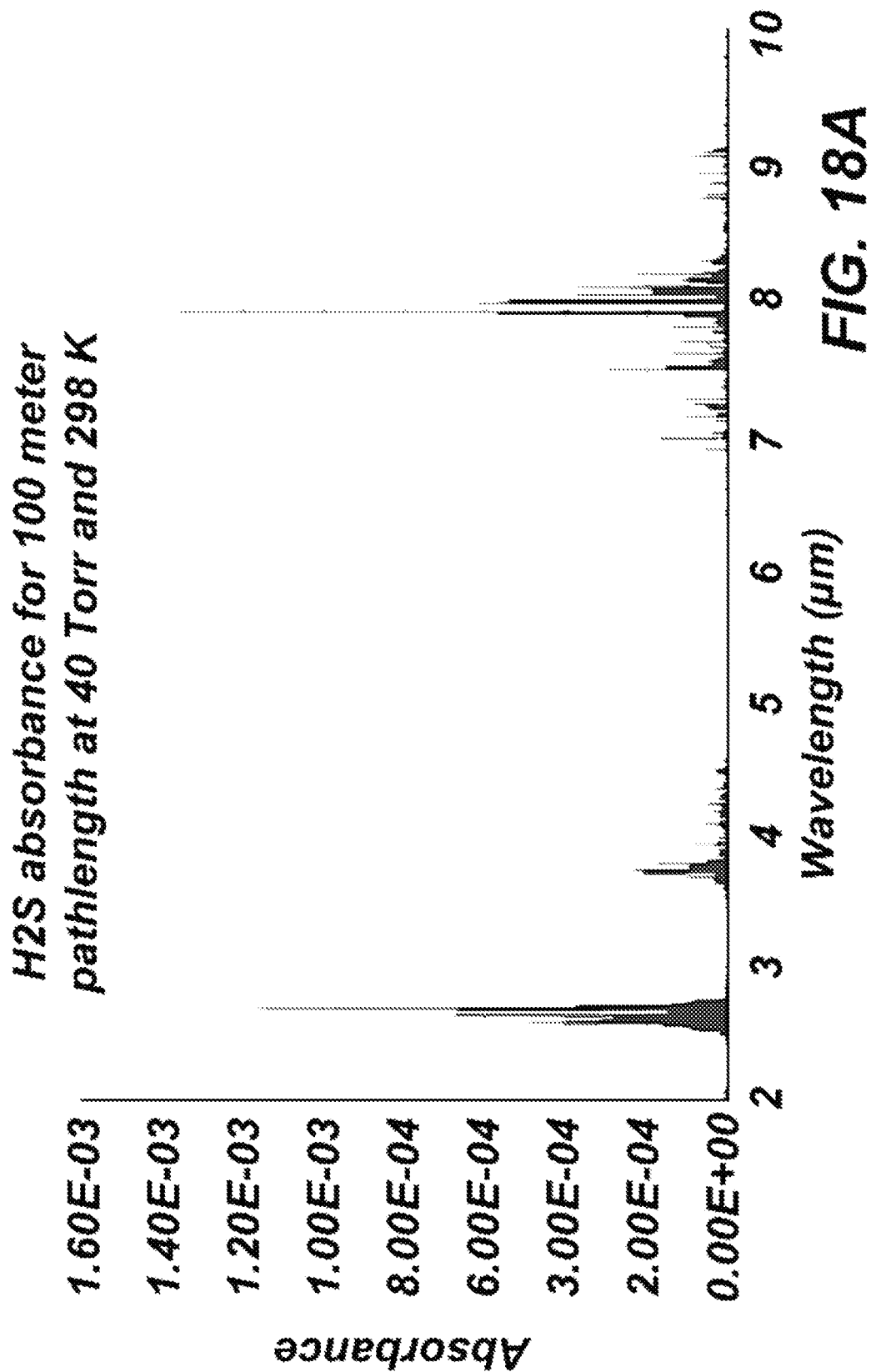
FIG. 18A is a graph of the direct absorption spectra of $H_2S$ for a 100 m pathlength at 40 Torr and 298K.

FIG. 18A shows the direct absorption spectra of $H_2S$ for a 100 m pathlength at 40 Torr and 298K. The strongest absorption lines of $H_2S$ are broadly distributed within broad bands at the 2.6 micron and 8 micron spectral region. Significant interferences are observed in the 2.6 micron and 2.7 micron region due to the fundamental (strongest) absorption band of $H_2O$ and a strong overtone band of $CO_2$, respectively. Likewise, a strong overtone absorption band of $CH_4$ near 7.8 microns also interferes with the mid-infrared $H_2S$ band. To minimize the influence of strong neighboring peaks on $H_2S$ absorption lines, it is necessary to reduce the pressure in the optical (multi-pass sample) cell so the linewidths narrow. Even with the narrower linewidths, the weak absorption lines of $H_2S$ require significantly greater optical path lengths and longer integration times to achieve the necessary detection limits and precision.

Figure 18B:
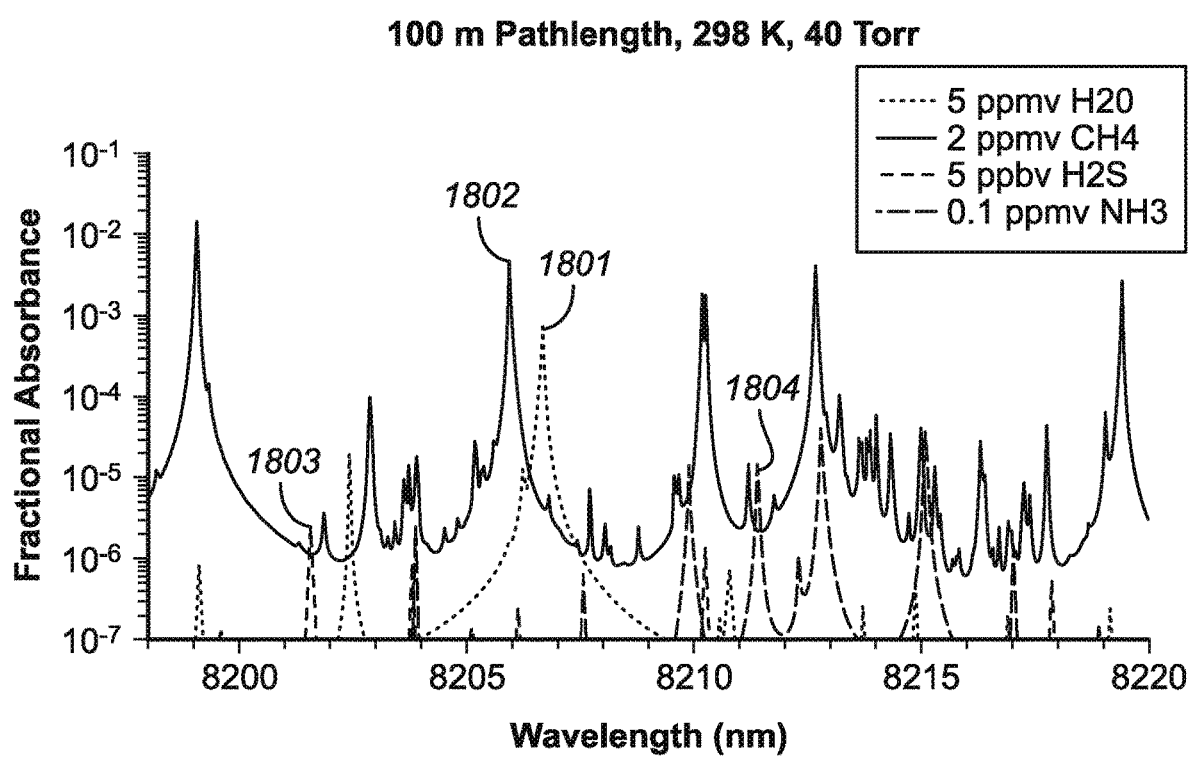
FIG. 18B is a graph of a calculated HITRAN direct absorption spectrum for at least a portion of a region where $H_2S$ (1803), $NH_3$ (1804), $CH_4$ (1802), and $H_2O$ (1801) all have reasonably strong absorption features for a 100 m pathlength at 40 Torr and 298K.

The HITRAN and GEISA spectral databases were analyzed to identify the strongest and most isolated absorption lines of $H_2S$. FIG. 18B shows a calculated HITRAN spectrum for a region where $H_2S$ (1803), $NH_3$ (1804), $CH_4$ (1802), and $H_2O$ (1801) all have reasonably strong absorption features. All four gases are plotted at their ISO specifications for a 100 m path length, 40 Torr pressure, and 298 K (i.e. 5 ppbv $H_2S$, 0.2 ppmv CO, 2 ppmv $CO_2$, 0.1 ppmv $NH_3$, 5 ppmv $H_2O$). Note that the fractional absorbance (y-axis) is plotted on a logarithmic scale. Several isolated lines allow for multi-species detection. The spectral range (2.5 cm$^{-1}$) is less than the current tuning rates in most quantum cascade lasers (5 cm$^{-1}$), so a single laser can probe all of these absorption features.

Detection at this wavelength relies on tuning the laser current to probe individual lines. The example 2 detection scheme provides that the NH$_3$ line at 8211 nm (1804) is first probed for a duration of 100 s. With an absorbance of 2×10$^{-5}$, the measurement precision would be 20:1. Next, the laser is tuned to the strong H$_2$O line at 8207 nm (1801) for a few seconds of measurements. In a similar fashion, the even stronger CH$_4$ line at 8206 nm (1802) is probed also only for a few seconds. For the remainder of the measurement period, the isolated H$_2$S absorption peak at 8202 nm (1803) is probed. Being the weakest absorption line, most of the measurement period would be dedicated to signal averaging of this feature. A signal-to-noise ratio of at least 10:1 is expected at 5 ppbv. All four gases are measured below their ISO specifications (i.e. 5 ppbv H$_2$S, 0.2 ppmv CO, 2 ppmv CO$_2$, 0.1 ppmv NH$_3$, 5 ppmv H$_2$O).

Those skilled in the art will recognize or be able to ascertain using no more than routine experimentation, many equivalents to the specific embodiments of the invention described herein. Such equivalents are intended to be encompassed by the following claims.

The invention claimed is:

1. A spectroscopic device for detecting one or more gas species of interest in a gas sample, the device comprising:
    a sensing unit that comprises:
        a light source module,
        a detector module, and
        a sample cell between the light source module and the detector module;
    wherein the light source module comprises a light source module housing and a light source that is configured to transmit an interrogation light beam along an optical path directed toward the detector module;
    wherein the detector module comprises a detector module housing, a detector, and a reference gas;
    wherein said detector is in the detector module housing;
    wherein the detector is positioned in the optical path such that the optical path extends from the light source through the sample cell and the reference gas toward the detector.

2. The spectroscopic device according to claim 1, wherein said device does not comprise a separate reference cell.

3. The spectroscopic device according to claim 2, wherein the detector comprises the reference gas.

4. The spectroscopic device according to claim 3, wherein the detector comprises a detector cap that holds the reference gas.

5. The spectroscopic device according to claim 1, wherein the sensing unit further comprises a reference cell that holds the reference gas.

6. The spectroscopic device according to claim 1, wherein the reference gas comprises one or two or more gas species of interest to be detected, wherein optionally the reference gas has a pressure of below atmospheric pressure.

7. The spectroscopic device according to claim 6, wherein the reference gas consists essentially of the one or two or more gas species of interest to be detected and at least one spectrally-inert gas species, optionally nitrogen.

8. The spectroscopic device according to claim 6, wherein the sample cell comprises at least one gas species of interest to be detected in the reference gas.

9. The spectroscopic device according to claim 6, wherein the sample cell comprises hydrogen gas and at least one gas species of interest to be detected in the reference gas.

10. The spectroscopic device according to claim 6, wherein the one or two or more gas species of interest to be detected comprise at least one of hydrogen sulfide (H$_2$S), carbon monoxide (CO), methane (CH$_4$), water vapor (H$_2$O), and ammonia (NH$_3$).

11. The spectroscopic device according to claim 1, wherein the sample cell comprises a multi-pass optical cell.

12. The spectroscopic device according to claim 1, wherein the sample cell comprises a single-pass optical cell.

13. The spectroscopic device according to claim 1, further comprising a first light transmission window through which the optical path travels from the light source to the sample cell.

14. The spectroscopic device according to claim 13, wherein the first light transmission window has an area in a range of at least 1 mm$^2$ and up to 30 mm$^2$.

15. The spectroscopic device according to claim 13, wherein the first light transmission window and a second light transmission window has a thickness in a range of at least 0.5 mm and up to 10 mm.

16. The spectroscopic device according to claim 1, wherein the sample cell further comprises a sample gas input port and a sample gas output port to allow a flow of sample gas to be introduced to the sample cell.

17. The spectroscopic device according to claim 16, wherein the sample gas input port and the sample gas output port are positioned about 180 degrees from each other.

18. The spectroscopic device according to claim 1, further comprising:
    a processor configured to isolate a direct absorption spectroscopy (DAS) signal from the reference gas and a wavelength modulated spectroscopy (WMS) signal from the sample gas based on the intensity of the interrogation light beam after passing through the reference gas and the sample cell and generate calibration information by setting the direct absorption spectroscopy (DAS) signal as the constant reference signal for the wavelength modulated spectroscopy (WMS) signal.

19. The spectroscopic device according to claim 18, wherein the wavelength modulated spectroscopy (WMS) signal comprises a 2$^{nd}$ or higher harmonic of the intensity of the interrogation light beam after passing through the reference gas and sample cell.

20. The spectroscopic device according to claim 18, wherein the processor is configured to determine the concentration of the one or two or more gas species of interest in the sample cell based on the wavelength modulated spectroscopy (WMS) signal from the sample cell.

21. A spectroscopic method for detecting one or more gas species of interest in a gas sample, the method comprising:
    transmitting an interrogation light beam from a coherent light source through a sample cell containing one or more gas species of interest to be detected, and a reference gas at below atmospheric pressure, said reference gas comprising at least one of the one or more gas species of interest to be detected in the sample cell, said coherent light source being disposed within a light source module comprising said coherent light source and a light source housing, said reference gas being disposed within a detector module comprising a detector module housing, a detector, and said reference gas, said sample cell being disposed between said light source module and said detector module;

detecting the intensity of the interrogation light beam after passing through the reference gas and the sample cell;

generating a direct absorption spectroscopy (DAS) signal based on the detected light intensity;

generating a wavelength modulated spectroscopy (WMS) signal based on the detected light intensity; and generating calibration information by setting the direct absorption spectroscopy (DAS) signal as the constant reference signal for the wavelength modulated spectroscopy (WMS) signal.

22. The spectroscopic method according to claim 21 further comprising:

determining the concentration of the one or two or more gas species of interest in the sample cell based on the wavelength modulated spectroscopy (WMS) signal.

23. The spectroscopic method according to claim 21, wherein the wavelength modulated spectroscopy (WMS) signal comprises a $2^{nd}$ or higher harmonic of the intensity of the detected light intensity.

* * * * *